(12) United States Patent
Sayers et al.

(10) Patent No.: US 12,419,274 B1
(45) Date of Patent: Sep. 23, 2025

(54) CENTRIFUGAL PUMP PET WATER FOUNTAIN

(71) Applicant: Radio Systems Corporation, Knoxville, TN (US)

(72) Inventors: Kevin Michael Sayers, Knoxville, TN (US); Cody Lee Stricklin, Knoxville, TN (US); Anita Rechelle White, Knoxville, TN (US); Jonathan William Huber, Knoxville, TN (US); Marc Edward Brush, Knoxville, TN (US); Eric Alexander Ward, Knoxville, TN (US); Grant Matthew Given, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 18/386,676

(22) Filed: Nov. 3, 2023

Related U.S. Application Data

(60) Division of application No. 17/219,549, filed on Mar. 31, 2021, now Pat. No. 11,825,822, which is a
(Continued)

(51) Int. Cl.
| | | |
|---|---|---|
| *A01K 7/02* | (2006.01) | |
| *C02F 1/28* | (2023.01) | |
| *C02F 103/20* | (2006.01) | |

(52) U.S. Cl.
CPC ............... *A01K 7/02* (2013.01); *C02F 1/283* (2013.01); *C02F 2103/20* (2013.01); *C02F 2301/04* (2013.01); *C02F 2307/10* (2013.01)

(58) Field of Classification Search
CPC .. C02F 1/283; C02F 2103/20; C02F 2301/04; C02F 2307/10; A01K 7/02
See application file for complete search history.

(56) References Cited

U.S. PATENT DOCUMENTS

| 1,278,285 A | 9/1918 | Allen et al. |
| 1,481,365 A | 1/1924 | William et al. |
| (Continued) | | |

FOREIGN PATENT DOCUMENTS

| AU | 2014334919 B2 | 2/2017 |
| CA | 682630 A | 3/1964 |
| (Continued) | | |

OTHER PUBLICATIONS

Amendment Filed on Apr. 9, 2016 for Non-final Office Action dated Feb. 1, 2016 for U.S. Appl. No. 14/308, 191, filed Jun. 18, 2014, 42 pages.
(Continued)

*Primary Examiner* — J. Todd Newton
(74) *Attorney, Agent, or Firm* — Baker Donelson Bearman Caldwell & Berkowitz, PC

(57) ABSTRACT

A pet water fountain is described comprising a bowl for holding an aqueous drinking fluid. The pet water fountain includes a housing configured to cover a portion of the bowl and have a fluid reservoir. The pet water fountain includes a rotatable cone positioned within the housing, the cone tapering outwardly from a bottom end to a top end, the bone bottom end having a fluid inlet to allow the passage of fluid from the bowl through the inlet and into the interior of the conde, the cone top end being in fluid communication with the housing fluid reservoir. The pet water fountain includes a filter ring coupled to the cone top end, the filter ring having an exterior housing and a filter media positioned within the exterior housing, and an electric motor coupled to the rotatable cone for rotatably driving the rotatable cone.

17 Claims, 16 Drawing Sheets

Related U.S. Application Data continuation-in-part of application No. 16/561,607, filed on Sep. 5, 2019, now Pat. No. 11,470,813.

(60) Provisional application No. 62/727,225, filed on Sep. 5, 2018.

(56) References Cited

U.S. PATENT DOCUMENTS

| | | |
|---|---|---|
| 2,034,968 A | 3/1936 | Bartlett |
| 2,103,653 A | 12/1937 | Weil |
| 2,258,926 A * | 10/1941 | Campbell ......... B01D 46/2403 55/504 |
| 2,366,766 A | 1/1945 | Charles et al. |
| 2,510,212 A | 6/1950 | Donnell |
| 2,510,252 A | 6/1950 | Morton et al. |
| 2,510,446 A | 6/1950 | Weil |
| 2,572,379 A | 10/1951 | Jeffery et al. |
| 2,678,630 A | 5/1954 | Frederiksen |
| 2,726,636 A | 12/1955 | Frederiksen |
| 2,775,227 A | 12/1956 | Henry et al. |
| 2,878,781 A | 3/1959 | Otto et al. |
| 3,061,036 A | 10/1962 | Barton et al. |
| 3,179,085 A | 4/1965 | McKillip, Jr. |
| 3,228,377 A | 1/1966 | Grassano et al. |
| 3,272,181 A | 9/1966 | Ramsey et al. |
| 3,459,159 A | 8/1969 | Weldon et al. |
| 3,505,978 A | 4/1970 | Nilsen et al. |
| 3,537,430 A | 11/1970 | Peppler et al. |
| 3,777,714 A | 12/1973 | Danielsson et al. |
| 3,831,558 A | 8/1974 | Forbes et al. |
| 3,853,429 A | 12/1974 | Wiedenmann et al. |
| 3,868,926 A | 3/1975 | Olde et al. |
| 3,897,753 A | 8/1975 | Lee et al. |
| 3,901,191 A | 8/1975 | Smith et al. |
| 3,903,845 A | 9/1975 | Little et al. |
| 3,920,224 A | 11/1975 | Fassauer et al. |
| 3,979,055 A | 9/1976 | Fathauer et al. |
| 4,022,159 A | 5/1977 | Salvia et al. |
| 4,098,229 A | 7/1978 | Haynes et al. |
| 4,244,820 A * | 1/1981 | Hauk ................. B01D 63/067 210/194 |
| 4,248,177 A | 2/1981 | Peterson et al. |
| 4,347,809 A | 9/1982 | Gloggler et al. |
| 4,386,582 A | 6/1983 | Adsit et al. |
| 4,463,706 A | 8/1984 | Meister et al. |
| 4,469,049 A | 9/1984 | Waynick et al. |
| 4,512,885 A | 4/1985 | Willinger et al. |
| 4,573,433 A | 3/1986 | Thompson et al. |
| 4,584,966 A | 4/1986 | Moore et al. |
| 4,705,216 A | 11/1987 | Kaffka et al. |
| 4,735,171 A | 4/1988 | Essex et al. |
| 4,747,538 A | 5/1988 | Dunn et al. |
| 4,782,790 A | 11/1988 | Batson et al. |
| 4,807,565 A | 2/1989 | Hawthorne et al. |
| 4,836,142 A | 6/1989 | Duback et al. |
| 4,924,812 A | 5/1990 | Bernays, Jr. et al. |
| 4,976,220 A | 12/1990 | Gershman et al. |
| 4,979,670 A | 12/1990 | Konle et al. |
| 4,993,364 A | 2/1991 | Hessenauer et al. |
| 5,052,343 A | 10/1991 | Sushelnitski et al. |
| 5,122,274 A | 6/1992 | Heskett et al. |
| 5,135,654 A | 8/1992 | Heskett et al. |
| 5,149,437 A | 9/1992 | Wilkinson et al. |
| 5,167,368 A | 12/1992 | Nash et al. |
| 5,198,118 A | 3/1993 | Heskett et al. |
| 5,247,963 A | 9/1993 | Hostetler et al. |
| 5,269,919 A | 12/1993 | Von Medlin et al. |
| 5,269,932 A | 12/1993 | Heskett et al. |
| 5,275,737 A | 1/1994 | Heskett et al. |
| 5,314,623 A | 5/1994 | Heskett et al. |
| 5,329,876 A | 7/1994 | Tracy et al. |
| D350,842 S | 9/1994 | VanSkiver et al. |
| 5,349,925 A | 9/1994 | Zerato et al. |
| 5,369,032 A | 11/1994 | Pratt et al. |
| 5,415,770 A | 5/1995 | Heskett et al. |
| 5,433,171 A | 7/1995 | Ewell et al. |
| 5,433,856 A | 7/1995 | Heskett et al. |
| 5,483,923 A | 1/1996 | Sabbara et al. |
| D367,735 S | 3/1996 | VanSkiver et al. |
| 5,501,178 A | 3/1996 | Kemp et al. |
| 5,510,034 A | 4/1996 | Heskett et al. |
| D374,516 S | 10/1996 | Lillelund et al. |
| 5,599,454 A | 2/1997 | Heskett et al. |
| 5,637,361 A | 6/1997 | Scheurich et al. |
| D383,797 S | 9/1997 | Finnegan et al. |
| 5,778,820 A | 7/1998 | Van Der Lely et al. |
| 5,799,609 A | 9/1998 | Burns et al. |
| 5,833,859 A | 11/1998 | Heskett et al. |
| 5,837,134 A | 11/1998 | Heskett et al. |
| D402,425 S | 12/1998 | Lacz et al. |
| 5,842,437 A | 12/1998 | Burns et al. |
| 5,934,223 A | 8/1999 | Ellery-Guy et al. |
| 5,951,869 A | 9/1999 | Heskett et al. |
| 5,992,349 A | 11/1999 | Sachs et al. |
| 6,044,795 A | 4/2000 | Matsuura et al. |
| 6,055,934 A | 5/2000 | Burns et al. |
| D428,217 S | 7/2000 | Rodack et al. |
| 6,132,612 A | 10/2000 | Bourgeois et al. |
| 6,135,056 A | 10/2000 | Kuo et al. |
| 6,149,070 A | 11/2000 | Hones et al. |
| D435,321 S | 12/2000 | Avila et al. |
| 6,197,204 B1 | 3/2001 | Heskett et al. |
| 6,200,471 B1 * | 3/2001 | Nohren, Jr. ............ C02F 1/003 210/282 |
| 6,257,560 B1 | 7/2001 | Kim et al. |
| 6,367,417 B1 | 4/2002 | Gal et al. |
| D457,692 S | 5/2002 | Skurdalsvold et al. |
| 6,401,657 B1 | 6/2002 | Krishnamurthy et al. |
| 6,460,483 B1 | 10/2002 | Northrop et al. |
| 6,467,428 B1 | 10/2002 | Andrisin et al. |
| 6,526,916 B1 | 3/2003 | Perlsweig et al. |
| 6,622,657 B2 | 9/2003 | Northrop et al. |
| 6,651,591 B1 | 11/2003 | Chelen et al. |
| 6,651,592 B2 | 11/2003 | Maddox et al. |
| 6,655,934 B2 | 12/2003 | Mittelstein et al. |
| 6,672,253 B1 | 1/2004 | Viola et al. |
| 6,694,916 B1 | 2/2004 | Rucker et al. |
| D490,577 S | 5/2004 | Steinbacher et al. |
| 6,733,356 B2 | 5/2004 | Lee et al. |
| 6,748,669 B1 | 6/2004 | Burgess et al. |
| 6,748,699 B2 | 6/2004 | Taylor et al. |
| 6,792,891 B1 | 9/2004 | Coburn et al. |
| 6,845,735 B1 | 1/2005 | Northrop et al. |
| D503,247 S | 3/2005 | Ross et al. |
| 6,863,025 B2 | 3/2005 | Ness et al. |
| D506,352 S | 6/2005 | Dow et al. |
| D507,755 S | 7/2005 | Reitze et al. |
| D513,930 S | 1/2006 | Novi et al. |
| 6,983,722 B2 | 1/2006 | Tepper et al. |
| 6,988,465 B2 | 1/2006 | Park et al. |
| 6,990,927 B2 | 1/2006 | Axelrod et al. |
| 7,021,556 B2 | 4/2006 | Muir et al. |
| 7,040,249 B1 | 5/2006 | Mushen et al. |
| D522,807 S | 6/2006 | Dow et al. |
| D527,224 S | 8/2006 | Roth et al. |
| 7,089,881 B2 | 8/2006 | Plante et al. |
| D527,951 S | 9/2006 | Roth et al. |
| D527,954 S | 9/2006 | Roth et al. |
| 7,124,707 B1 | 10/2006 | Clarke et al. |
| 7,146,930 B1 | 12/2006 | Ness et al. |
| 7,156,994 B1 | 1/2007 | Archer et al. |
| D538,041 S | 3/2007 | Reitze et al. |
| 7,198,005 B2 | 4/2007 | Polimeni, Jr. et al. |
| 7,228,816 B2 | 6/2007 | Turner et al. |
| 7,270,081 B2 | 9/2007 | Park et al. |
| 7,270,082 B2 | 9/2007 | Plante et al. |
| D556,511 S | 12/2007 | Mansfield et al. |
| D558,519 S | 1/2008 | Zemel et al. |
| D559,472 S | 1/2008 | Abinanti et al. |
| D562,074 S | 2/2008 | Mansfield et al. |
| D563,605 S | 3/2008 | Morris et al. |
| D564,286 S | 3/2008 | Zemel et al. |
| 7,380,518 B2 | 6/2008 | Kates et al. |

(56) References Cited

U.S. PATENT DOCUMENTS

| | | |
|---|---|---|
| 7,389,748 B2 | 6/2008 | Shatoff et al. |
| RE40,430 E | 7/2008 | Markham et al. |
| D572,533 S | 7/2008 | Mansfield et al. |
| 7,395,782 B1 | 7/2008 | Lindsay et al. |
| D574,183 S | 8/2008 | Broom et al. |
| D575,986 S | 9/2008 | Cetera et al. |
| 7,426,901 B2 | 9/2008 | Turner et al. |
| 7,430,988 B2 | 10/2008 | Perlsweig et al. |
| 7,458,336 B2 | 12/2008 | Eu et al. |
| 7,467,603 B2 | 12/2008 | Davies et al. |
| 7,472,785 B2 | 1/2009 | Albright et al. |
| D587,529 S | 3/2009 | Pratt et al. |
| 7,513,216 B2 | 4/2009 | Neckel et al. |
| D596,461 S | 7/2009 | Mansfield et al. |
| D598,224 S | 8/2009 | Zanini et al. |
| 7,624,702 B1 | 12/2009 | Fritz et al. |
| 7,647,894 B1 | 1/2010 | Axelrod et al. |
| 7,757,636 B2 | 7/2010 | McCallum et al. |
| D621,556 S | 8/2010 | Hewson et al. |
| 7,832,362 B2 | 11/2010 | DeGhionno et al. |
| D629,974 S | 12/2010 | Northrop et al. |
| 7,849,817 B1 | 12/2010 | Warganich et al. |
| 7,909,003 B2 | 3/2011 | Willinger et al. |
| 7,914,468 B2 | 3/2011 | Shalon et al. |
| D636,539 S | 4/2011 | Montoya et al. |
| 7,918,186 B2 | 4/2011 | Rowe et al. |
| D637,770 S | 5/2011 | Lipscomb et al. |
| 7,946,251 B2 | 5/2011 | Hass et al. |
| 7,958,844 B1 | 6/2011 | Northrop et al. |
| 7,984,694 B2 | 7/2011 | Wu et al. |
| D642,745 S | 8/2011 | Veness et al. |
| D642,746 S | 8/2011 | Weber et al. |
| 7,987,817 B2 | 8/2011 | Johnson et al. |
| 8,011,205 B2 | 9/2011 | Roth et al. |
| 8,011,324 B1 | 9/2011 | Warganich et al. |
| D648,904 S | 11/2011 | Tedaldi et al. |
| D650,861 S | 12/2011 | Chuang et al. |
| 8,100,084 B1 | 1/2012 | Abramson et al. |
| D655,870 S | 3/2012 | Carlin, Jr. et al. |
| 8,141,521 B2 | 3/2012 | Shatoff et al. |
| 8,146,538 B2 | 4/2012 | Kling et al. |
| 8,153,176 B2 | 4/2012 | Etayo Garralda et al. |
| D658,818 S | 5/2012 | Lipscomb et al. |
| D658,819 S | 5/2012 | Lipscomb et al. |
| D659,301 S | 5/2012 | Lipscomb et al. |
| D659,914 S | 5/2012 | Lipscomb et al. |
| 8,166,922 B2 | 5/2012 | Jalbert et al. |
| 8,171,885 B1 | 5/2012 | Northrop et al. |
| 8,225,747 B2 | 7/2012 | Markham et al. |
| D665,134 S | 8/2012 | Lipscomb et al. |
| D665,870 S | 8/2012 | Fang et al. |
| 8,245,665 B2 | 8/2012 | Willett et al. |
| 8,347,817 B1 | 1/2013 | Miller et al. |
| D677,018 S | 2/2013 | Miller et al. |
| 8,367,130 B1 | 2/2013 | Tsengas et al. |
| 8,381,685 B2 | 2/2013 | Lipscomb et al. |
| 8,387,566 B2 | 3/2013 | Graves et al. |
| D681,887 S | 5/2013 | Fang et al. |
| D681,888 S | 5/2013 | Fang et al. |
| 8,436,735 B2 | 5/2013 | Mainini et al. |
| 8,464,664 B1 | 6/2013 | Scheffler et al. |
| D686,783 S | 7/2013 | Pluss et al. |
| 8,474,404 B2 | 7/2013 | Costello et al. |
| 8,511,255 B2 | 8/2013 | Hass et al. |
| 8,516,975 B2 | 8/2013 | Becattini, Jr. et al. |
| 8,516,977 B2 | 8/2013 | Shatoff et al. |
| D689,245 S | 9/2013 | Rowe et al. |
| D692,623 S | 10/2013 | Lipscomb et al. |
| 8,555,814 B2 | 10/2013 | Parks et al. |
| D694,477 S | 11/2013 | Rowe et al. |
| 8,701,595 B2 | 4/2014 | Jin et al. |
| D704,388 S | 5/2014 | Fang et al. |
| D704,389 S | 5/2014 | Fang et al. |
| D704,392 S | 5/2014 | Fang et al. |
| D704,903 S | 5/2014 | Fang et al. |
| 8,714,112 B2 | 5/2014 | Kling et al. |
| D709,655 S | 7/2014 | Lipscomb et al. |
| 8,770,147 B2 | 7/2014 | Rowe et al. |
| 8,776,725 B1 | 7/2014 | Grijalva et al. |
| 8,800,494 B2 | 8/2014 | Lipscomb et al. |
| 8,875,658 B2 | 11/2014 | Anderson et al. |
| 8,893,653 B2 | 11/2014 | Browning et al. |
| 8,904,967 B2 | 12/2014 | Reiss et al. |
| 8,925,485 B2 | 1/2015 | Pu et al. |
| 8,944,006 B2 | 2/2015 | Anderson et al. |
| 8,960,126 B2 | 2/2015 | Lipscomb et al. |
| 9,004,011 B2 | 4/2015 | Foley et al. |
| 9,004,012 B2 | 4/2015 | Taylor et al. |
| 9,060,528 B2 | 6/2015 | Axelrod et al. |
| 9,137,968 B2 | 9/2015 | Veness et al. |
| 9,156,950 B2 | 10/2015 | Garralda et al. |
| 9,260,223 B2 | 2/2016 | Kim et al. |
| 9,295,233 B2 | 3/2016 | Axelrod et al. |
| 9,301,496 B2 | 4/2016 | Reiss et al. |
| 9,339,011 B1 | 5/2016 | Crabtree et al. |
| 11,470,813 B2 | 10/2022 | Sayers et al. |
| 11,825,822 B2 | 11/2023 | Sayers et al. |
| 2002/0195001 A1 | 12/2002 | Hester et al. |
| 2004/0118356 A1 | 6/2004 | Krishnamurthy et al. |
| 2004/0194714 A1 | 10/2004 | Lee et al. |
| 2005/0061252 A1 | 3/2005 | Meeks et al. |
| 2005/0166853 A1 | 8/2005 | Plante et al. |
| 2005/0284382 A1 | 12/2005 | Stantchev et al. |
| 2006/0011145 A1 | 1/2006 | Kates et al. |
| 2006/0027179 A1 | 2/2006 | Welbourne et al. |
| 2006/0174838 A1 | 8/2006 | Plante et al. |
| 2006/0231040 A1 | 10/2006 | Bast et al. |
| 2006/0236948 A1 | 10/2006 | Wechsler et al. |
| 2007/0266959 A1 | 11/2007 | Brooks et al. |
| 2008/0011243 A1 | 1/2008 | Moulton et al. |
| 2008/0058670 A1 | 3/2008 | Mainini et al. |
| 2008/0190374 A1 | 8/2008 | Farris et al. |
| 2008/0257272 A1 | 10/2008 | Bolda et al. |
| 2008/0264963 A1 | 10/2008 | Teodorescu et al. |
| 2010/0030366 A1 | 2/2010 | Scherer et al. |
| 2010/0089329 A1 | 4/2010 | Lefferson et al. |
| 2010/0095897 A1 | 4/2010 | Rowe et al. |
| 2010/0147760 A1 | 6/2010 | Leavitt et al. |
| 2011/0017141 A1 | 1/2011 | Hewson et al. |
| 2011/0067638 A1 | 3/2011 | Lipscomb et al. |
| 2011/0259273 A1 | 10/2011 | Lipscomb et al. |
| 2011/0265726 A1 | 11/2011 | Banuelos et al. |
| 2011/0297090 A1 | 12/2011 | Chamberlain et al. |
| 2011/0297091 A1 | 12/2011 | Chamberlain et al. |
| 2012/0006282 A1 | 1/2012 | Kates et al. |
| 2012/0017839 A1 | 1/2012 | Veness et al. |
| 2012/0137979 A1 | 6/2012 | Lipscomb et al. |
| 2012/0325156 A1 | 12/2012 | Abramson et al. |
| 2013/0013104 A1 | 1/2013 | Carelli et al. |
| 2013/0019809 A1 | 1/2013 | McCallum et al. |
| 2013/0036981 A1 | 2/2013 | Lipscomb et al. |
| 2013/0087102 A1 | 4/2013 | Lipscomb et al. |
| 2013/0092090 A1 | 4/2013 | McCallum et al. |
| 2013/0174790 A1 | 7/2013 | Lipscomb et al. |
| 2013/0180458 A1 | 7/2013 | Lipscomb et al. |
| 2013/0199454 A1 | 8/2013 | Lipscomb et al. |
| 2013/0213308 A1 | 8/2013 | Koskey, Jr. et al. |
| 2013/0213872 A1 | 8/2013 | Phelan et al. |
| 2013/0228508 A1 | 9/2013 | Lipscomb et al. |
| 2014/0069341 A1 | 3/2014 | Lipscomb et al. |
| 2014/0076242 A1 | 3/2014 | Ho et al. |
| 2014/0090601 A1 | 4/2014 | Stone et al. |
| 2014/0158209 A1 | 6/2014 | Schiller et al. |
| 2014/0251223 A1 | 9/2014 | Rowe et al. |
| 2014/0263423 A1 | 9/2014 | Akdogan et al. |
| 2017/0130432 A1 | 5/2017 | Searcy et al. |
| 2019/0142144 A1* | 5/2019 | Rajan .................... B65D 35/10 222/212 |
| 2019/0239491 A1 | 8/2019 | Yu et al. |
| 2019/0343074 A1 | 11/2019 | Moretto et al. |
| 2020/0337266 A1 | 10/2020 | Yu et al. |

(56) References Cited

U.S. PATENT DOCUMENTS

| | | | |
|---|---|---|---|
| 2021/0144964 | A1 | 5/2021 | Wang et al. |
| 2021/0345582 | A1* | 11/2021 | Yoo .......................... G01C 9/02 |

FOREIGN PATENT DOCUMENTS

| | | | |
|---|---|---|---|
| CA | 1325561 | C | 12/1993 |
| CN | 1535751 | A | 10/2004 |
| CN | 200980971 | Y | 11/2007 |
| CN | 201234507 | Y | 5/2009 |
| CN | 201959605 | U | 9/2011 |
| CN | 202061477 | U | 12/2011 |
| CN | 202232489 | U | 5/2012 |
| CN | 202285810 | U | 7/2012 |
| CN | 202310841 | U | 7/2012 |
| CN | 202551860 | U | 11/2012 |
| CN | 203985484 | U | 12/2014 |
| EP | 0610171 | A2 | 8/1994 |
| EP | 0636312 | A1 | 2/1995 |
| EP | 1145627 | A2 | 10/2001 |
| EP | 1300074 | A2 | 4/2003 |
| EP | 1360895 | A2 | 11/2003 |
| GB | 2454658 | A | 5/2009 |
| JP | 2599615 | Y2 | 9/1999 |
| KR | 101127936 | B1 | 3/2012 |
| WO | 03015003 | A1 | 2/2003 |

OTHER PUBLICATIONS

Animal Planet Pet Feeder available through Amazon.com, accessed on Jun. 27, 2014, 1 page.
Aspen Automatic Pet Feeder Available through Amazon.com, assessed on Jun. 27, 2014, 1 page.
Australian Patent Examiner's First Report on Patent Application No. 2014334919 dated Dec. 9, 2016, 3 pages.
Auto Pet Feeder Available through www.autopet-feeder.com, accessed on Apr. 24, 2015, and Dec. 26, 2015, 4 pages.
Certificate of Patent Grant from the Australia IP Office for Reciprocal Corresponding Patent No. 2014334919 dated Jun. 2017, 1 page.
Chinese office action for Chinese Application No. 2014800355223 dataed Jan. 16, 2017, 15 pages.
CIPO Office Action for CA Application No. 2911406 dated Jun. 13, 2017, 3 pages.
Co-pending Design U.S. Appl. No. 29/448,927, filed Mar. 14, 2013, 3 pages.
Co-pending Design U.S. Appl. No. 29/449,001, filed Mar. 14, 2013, 3 pages.
Crestuff Automatic Portion Control Pet Feeder available through https://amazon.com/, accessed on Jun. 27, 2014, 1 page.
Ergo Auto Pet Feeder available through Amazon.com, accessed on Apr. 6, 2015, 3 pages.
ETSY website from Ceramic Pet Bowl Artist printed Mar. 26, 2013, 2 pages.
Extended European Search Report for European Application No. 14854865.4 dated Jun. 21, 2017, 15 pages.
Extended European Search Report for European Application No. 17176845.0 dated Oct. 9, 2017, 8 pages.
Extended European Search Report for European Application No. 18806101.4 dated Oct. 7, 2020, 7 pages.
Gate Feeder available through http://gatefeeder.com, accessed on Apr. 6, 2015, 3 pages.
Gatefeeder Smart Pet Feeder available through http://gatefeeder.com accessed on Apr. 20, 2014, and Dec. 26, 2015, 4 pages.
Gizmag, Furbo lets you dispense dog treats from afar, http://www.gizmag.com/furbo-pet-treat-camera/43038/, accessed on Jun. 24, 2016, 3 pages.
Indiegogo, https://www.indiegogo.com/projects/furbo-world-s-best-treat-tossing-dog-camera#/, accessed on Jun. 24, 2016, 3 pages.
International Preliminary Report on Patentability for Application No. PCT/US2014/043059 dated Dec. 22, 2015, 11 pages.
International Search Report and Written Opinion for Application No. PCT/US2014/043059 dated Apr. 29, 2015, 13 pages.
International Search Report and Written Opinion for Application No. PCT/US2018/34101 dated Aug. 24, 2018, 11 pages.
International Search Report and Written Opinion for Application No. PCT/US2019/049707 dated Oct. 29, 2019, 6 pages.
KDF Process Media published by Fluid Treatment, Inc., Apr. 2003, 8 pages.
Lusmo Automatic Pet Feeder available through https://www.lusmo.com/, accessed on Apr. 20, 2014 and Dec. 26, 2015, 8 pages.
Lusmo Automatic Pet Feeder available through lusmo.com, accessed on Apr. 6, 2015, 9 pages.
MOTA Automatic Pet Feeder available through https://www.mota.com/ accessed on Apr. 24, 2015, and Dec. 26, 2015, 4 pages.
MOTA Perfect Pet Dinner Automatic Food Feeder available through Walmart, accessed on Apr. 6, 2015, 2 pages.
Non-Final Office Action dated Dec. 9, 2013 for U.S. Appl. No. 13/345,261, filed Jan. 6, 2012, 12 pages.
Non-Final Office Action dated Feb. 1, 2016 for U.S. Appl. No. 14/308, 191, filed Jun. 18, 2014, 23 pages.
Notification of Transmittal of International Search Report and Written Opinion of the ISA for Application No. PCT/US2014/043059 dated Apr. 29, 2015, 2 pages.
Partial Supplementary European Search Report for European Application No. 14854865.4 dated Feb. 3, 2017, 7 pages.
Perfect Pet Feeder available through www.perfectpetfeeder.com accessed on Apr. 20, 2014, and Dec. 26, 2015, 10 pages.
Perfect Petfeeder available through www.perfectpetfeeder.com accessed on Apr. 6, 2015, 9 pages.
Pet mate Infinity Portion Control Pet Feeder available www.amazon.com/Petmate-Infinity-Portion, accessed on Apr. 24, 2015, 2 pages.
Pet Watch Automatic Pet Feeder available through www.amazon.com/watchautomatic-feeder, accessed on Apr. 24, 2015, 5 pages.
Petmate Infinity 5 lb Portion Control Automatic Dog Cat Feeder available through www.amazon.com, accessed on Apr. 6, 2015, 2 pages.
PetNet Automatic Pet Feeder available through www.petnet.io, accessed on Apr. 20, 2014, and Dec. 26, 2015, 8 pages.
Petnet Pet Feeder available through www.petnet.io, accessed on Apr. 6, 2015, 5 pages.
PetSafe Pet Feeder available through https://amazon.com/, accessed on Jun. 27, 2014, 1 page.
Petwant Automatic Pet Feeder available through Amazon.com, accessed on Jun. 27, 2014, 1 page.
Super Feeder available through https://super-feeder.com/, accessed on Apr. 6, 2015, 6 pages.
Super-Feeder Programmable Pet Feeder available through www.super-feeder.com, accessed on Apr. 20, 2014 and Dec. 26, 2015, 9 pages.
Watch Automatic Pet Feeder available through https://amazon.com/, accessed on Apr. 6, 2015, 5 pages.

* cited by examiner

CENTRIFUGAL PUMP PET WATER FOUNTAIN

CROSS REFERENCE TO RELATED APPLICATIONS

This is a divisional of U.S. patent application Ser. No. 17/219,549 filed Mar. 31, 2021 and entitled "Centrifugal Pump Pet Water Fountain", which is a continuation-in-part of U.S. patent application Ser. No. 16/561,607 filed Sep. 5, 2019 and entitled "Centrifugal Pump Pet Water Fountain", that claims the benefit of U.S. Provisional Patent Application No. 62/727,225 filed Sep. 5, 2018 and entitled "Centrifugal Pump Pet Water Fountain", each of which is incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

TECHNICAL FIELD

The present disclosure relates to the field of pet water fountains. More particularly, the disclosure relates to a pet water fountain which is designed to utilize a centrifugal pump and a water filter.

BACKGROUND OF THE INVENTION

Many animals have a preference for drinking flowing water. Flowing water is desirable for animals as it increases interest, which encourages them to drink more fluids. This, in turn, can help reduce problems with the animal's kidneys or urinary tract. Flowing water also improves water taste and quality, as flowing water typically has more dissolved oxygen, which can make the water taste better as well as provide potential health benefits.

A problem with water fountains is that the animal's hair and other debris may fall into the water, causing a problem with the water pump as well as contaminating the water. As such, water fountains have used debris filters. While the debris filter may remove debris from the water, it does not remove chemical contaminates. Therefore, some filters are two stage filters that includes a first, debris filter and a second, chemical filter. The chemical filter may be a carbon filter that is placed on the outlet side of the water pump. The problem with these two stage filters is that they frequently become clogged and they can create a significant backpressure resulting in low flow pressure.

Accordingly, a need exists for an easily maintained animal watering device that provides substantially continuously-moving, filtered, drinking water for animals without creating a significant amount of noise or heating of the drinking water.

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

BRIEF SUMMARY OF THE INVENTION

An animal watering fountain is provided herein. In one embodiment, the animal watering fountain includes a bowl. The bowl defines a basin with a side wall for holding an aqueous drinking fluid. The bowl is divided into a portion for drinking (a drinking basin) and a portion that is covered (an interior basin). The interior basin is not accessible to a pet.

The watering fountain also has a housing. The housing resides substantially within the bowl and serves to divide the bowl into its drinking basin and its interior basin. The housing further includes at least one port that serves as an inlet port for fluid flow. The inlet port may be grated and provides fluid communication between the drinking basin and the interior basin.

The watering fountain further includes a reservoir. The reservoir is disposed above the bowl and is configured to hold a portion of the drinking fluid. Preferably, the reservoir is integral to the housing.

The watering fountain also includes a water pump. The water pump is configured to receive the drinking fluid from the bottom of the interior basin (after it travels through the inlet port), and push the drinking fluid under pressure up to the reservoir.

The water pump includes an electric motor and a water lifting cone coupled to the motor for rotational drive. Filters may be incorporated into the cone to filter unwanted contaminants from the water. The water enters the bottom of the rotating cone within the interior basin and exits the top of the cone at the reservoir.

A filter ring is coupled to the cone top end, the filter ring has an exterior housing and a filtering media positioned within the exterior housing.

The reservoir may include a lip. The lip is dimensioned and arranged to deliver drinking fluid from the reservoir back into the drinking basin of the bowl at a splash location.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
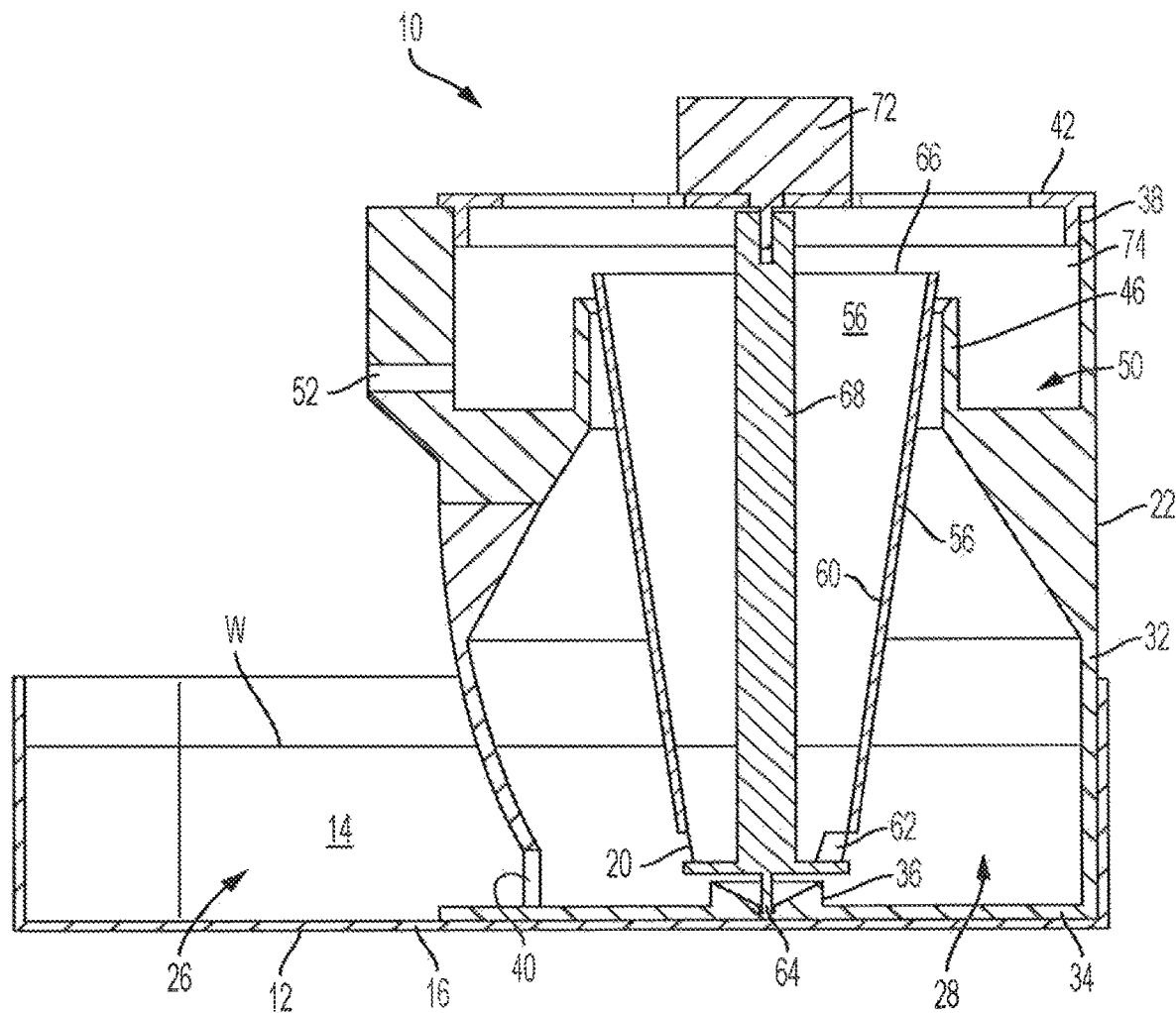
FIG. 1 is a schematic cross-sectional view of a centrifugal pump pet drinking fountain embodying principles of the invention.

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

DESCRIPTION OF SELECTED SPECIFIC EMBODIMENTS

With reference next to the drawings, there is a shown a centrifugal pump pet water fountain 10 in a form of the present invention, referenced herein as pet water fountain 10. The pet water fountain 10 has a basin or bowl 12. The bowl 12 is defined by a peripheral wall 14 extending upwardly from a floor 16. The bowl 12 is configured to hold an aqueous drinking fluid, such as water W, for a pet.

The pet water fountain 10 not only holds the water W, but also circulates that water W so that it remains fresh and oxygenated. In addition, the water W may be filtered so that it is maintained in a clean or particle-free state. In order to provide the circulation and filtering functions, various components are provided. Those components are generally held within a housing 22 and are visible in the cross-sectional view of FIG. 1.

The housing 22 divides the bowl 12 into a drinking portion or basin 26 and an interior portion or basin 28. The drinking basin 26 is accessible to an animal at the front of the fountain 10, while the interior basin 28 is located behind and underneath the housing 22 and is not accessible to the animal.

The housing 22 includes an upright, tubular sidewall 32 extending from a floor 34. The housing 22 is separable or removable from the bowl 12 for cleaning purposes. The floor 34 has a boss or bushing 36. The sidewall 32 defines a top opening 38 and has an inlet port or bottom opening 40 which allows the flow of water V from the drinking portion 26 to the interior portion 28. A cap 42 is telescopically and removably mounted to the top opening 38 of the housing 22.

The housing 22 also defines an annular cone mounting flange 46 which is spaced from the sidewall 32 so as to create a water reservoir 50 therebetween. The housing sidewall 32 also includes a spout 52 located adjacent the top opening 38 and in fluid communication with the reservoir 50.

A rotating cone-shaped water lifting tube or cone 56 is positioned within the housing 22 concentrically within the cone mounting flange 46. The cone 56 has an outer sidewall 60 which narrows or tapers as it extends downwardly to a water opening or inlet 62 adjacent a bottom pivot pin or spindle 64. The spindle 64 is configured to be journaled within the floor bushing 36. The cone sidewall 60 also defines an open top opening 66 opposite the inlet 62. An axle 68 extends from the spindle 64 to a position near and concentrically with the top opening 66.

The axle 68 is coupled to an electric motor 72 which is mounted to the exterior, top surface of the top cap 42. The electric motor 72 may be any conventionally know AC, DC, brush, or brushless electric motor which may cause rotational movement of the axle 68, and thus the rotational movement of the entire cone 56, as indicated by arrow A in FIG. 2. The electric motor 72 is electrically coupled to an optional electric kill switch 74 positioned to engage the cap 42 when it is coupled to the housing 22 in a closed position. The motor may operate at different speeds according to the current provided to the motor, or may be regulated through a multi-position switch which also regulates the current to the motor In use, water W is placed within the bowl 12 so that it rises to the appropriate level within the bowl 12 so as to fill both the drinking basin 26 and the interior basin 28. With the water W filled to this level, the water is well above the position of the cone inlet 62. The water fills the interior basin 28 by passing from the drinking basin 26 through the housing bottom opening 40 and into the interior basin 28.

Figure 2:
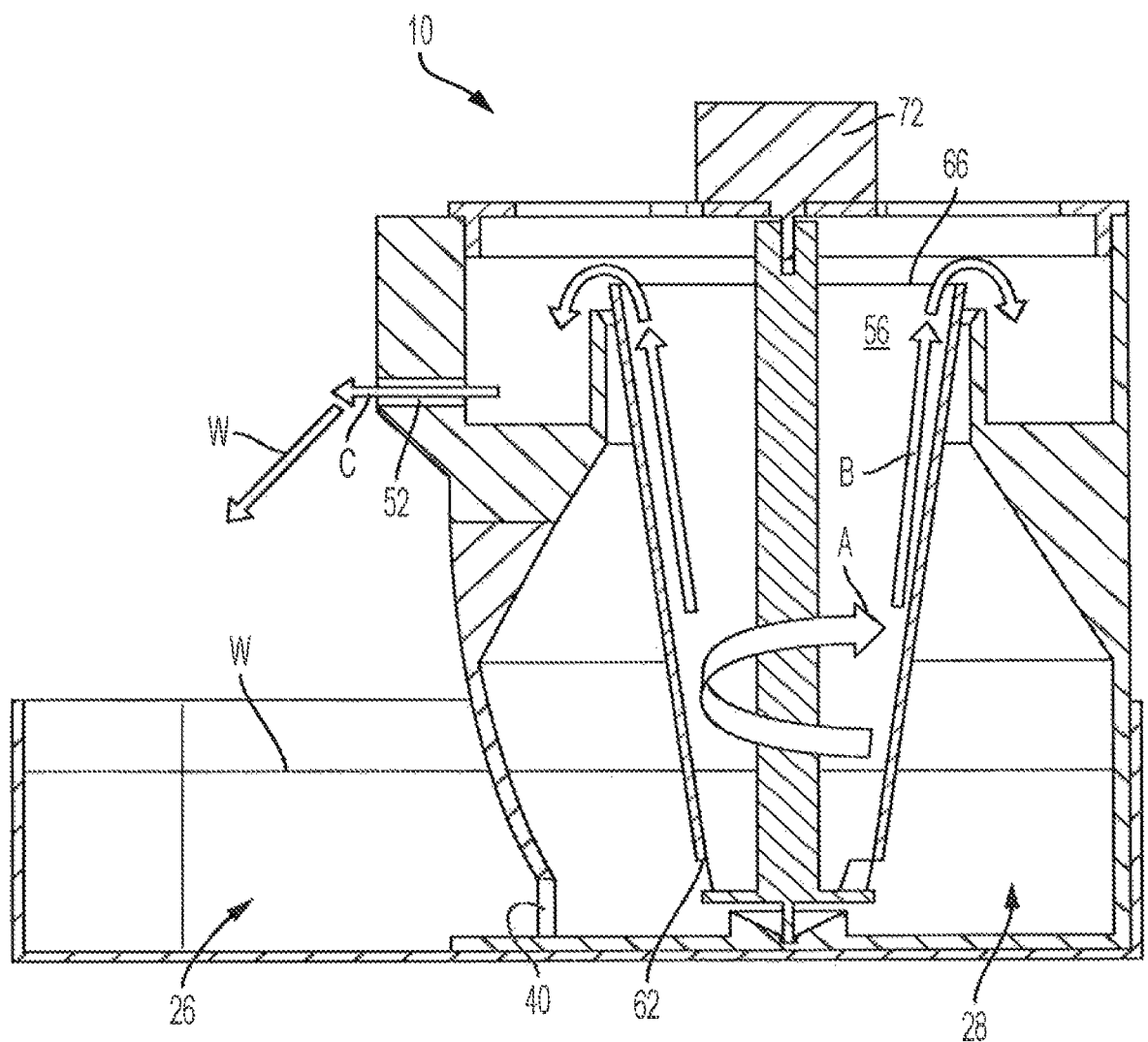
FIG. 2 is a schematic, cross-sectional view of the centrifugal pump pet drinking fountain of FIG. 1, showing the flow of water.
Figure 3:
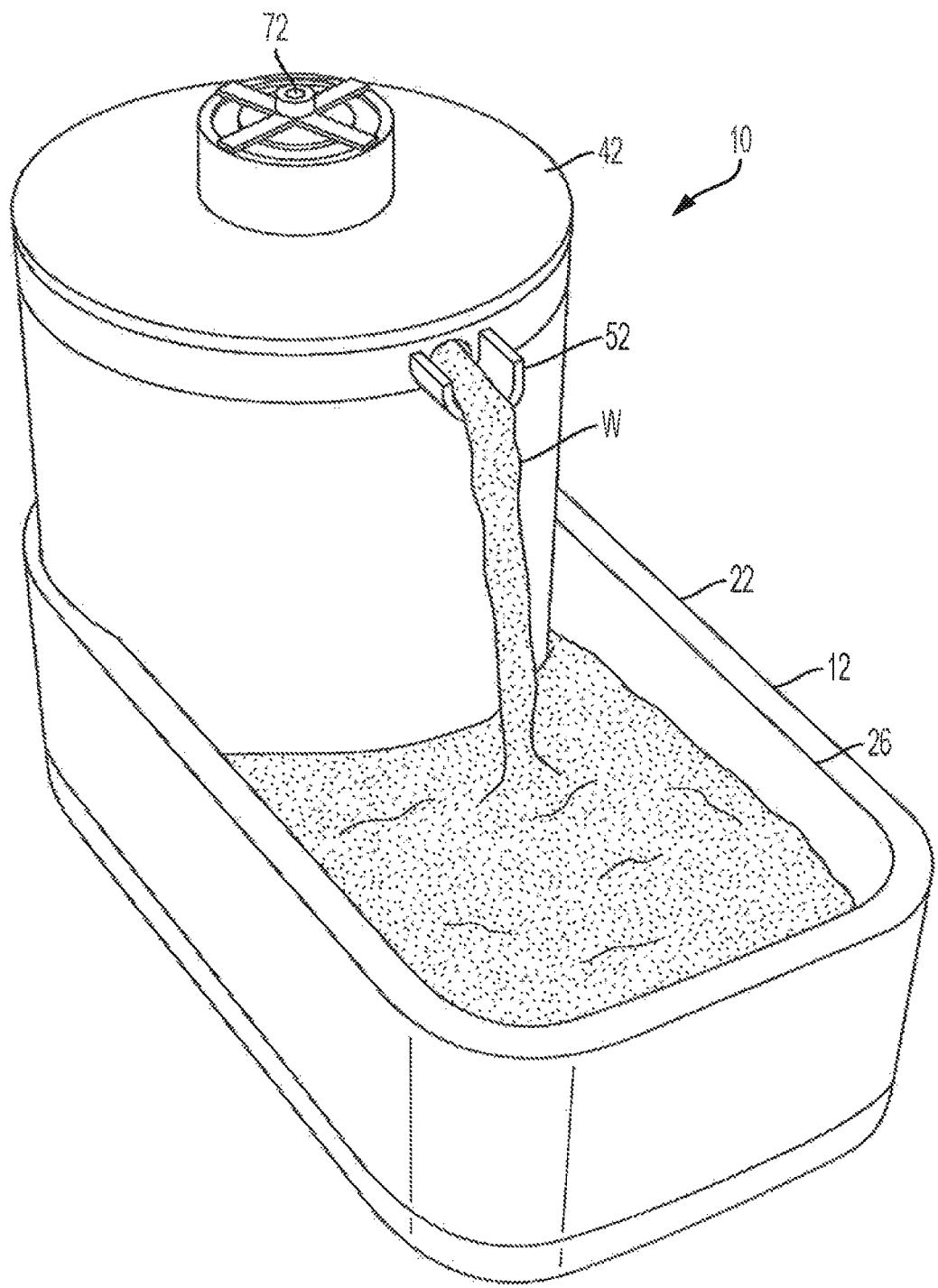
FIG. 3 is a perspective view of the centrifugal pump pet drinking fountain of FIG. 1.

With energization of the electric motor 72, the motor imparts a rotational motion upon the cone axle 68, which causes the entire cone 56 to rotate, as shown by arrow A in FIG. 2. The rotational motion of the cone 56 causes water within the bottom portion of the cone to climb the interior surface of the outwardly tapered sidewalls 60 through centrifugal force, as shown by arrow B in FIG. 2. As the water flows over the top of the cone 56 or sidewalls 60, the water W is thrown into the reservoir 50.

The water W within the reservoir 50 pools until it reaches the level of the spout 52, wherein the water W starts to flow over the spout 52 and drops down back into the drinking basin 26, as shown by arrow C in FIG. 2. Thus, the water W continuously circulates or flows from the drinking basin 26, through the bottom opening 40 to the interior basin 28 where it is pumped into the reservoir 50 through the rotational action of the cone 56, and out of the reservoir 50 through the spout 52 and back into the drinking basin 26.

Figure 4:
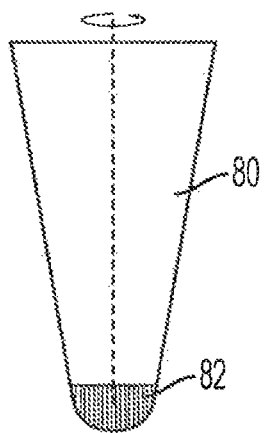
FIG. 4 is a side view of the cone portion of a centrifugal pump pet drinking fountain in an alternative embodiment.

With reference next to FIG. 4, there is shown a cone 80 in another form of the invention. Here, the cone 80 includes a debris filter 82 coupled to the bottom end of the cone 80. The debris filter 82 limits the passage of large particles or hair from entering the cone 80, thus filtering the water W passing through the water fountain.

The debris filter 82 may also be configured to snap onto the bottom of the cone so that a cone manufactured as two halves may be held together through the use of the debris filter 82.

Figure 5:
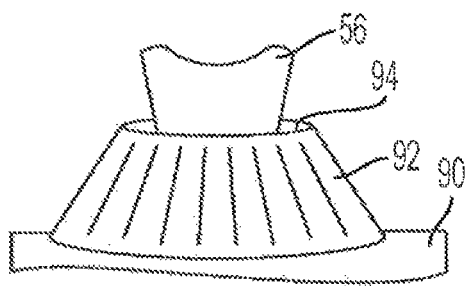
FIG. 5 is a side view of the cone portion of a centrifugal pump pet drinking fountain in an alternative embodiment.

With reference next to FIG. 5, there is shown a bottom portion 90 of the housing 22 in another form of the invention. Here, the housing floor includes an annular debris filter 92 having a central channel 94 which is configured to receive a bottom portion of the cone 56. The debris filter 92 limits the passage of large particles and hair from entering the cone 56, thus filtering the water W passing through the water fountain.

Figure 6:
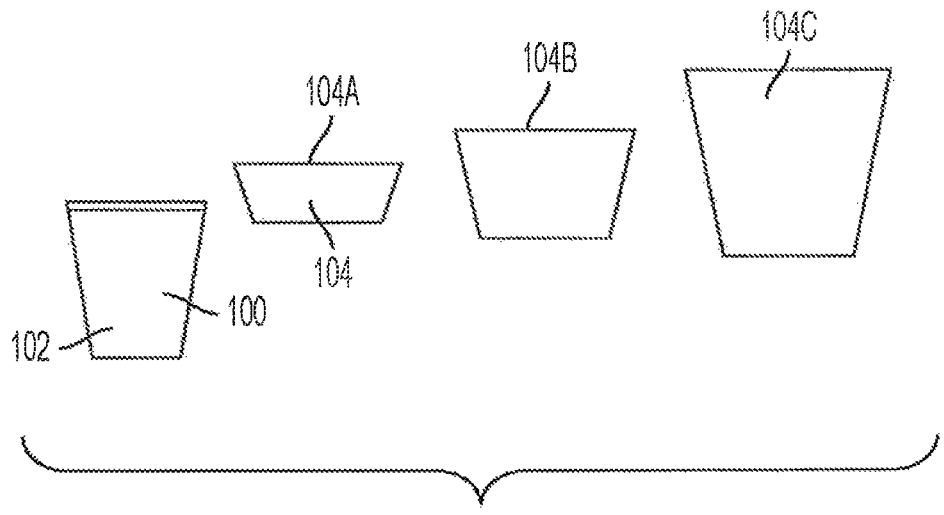
FIG. 6 is a side view of the cone portion of a centrifugal pump pet drinking fountain in an alternative embodiment.

With reference next to FIG. 6, there is shown a cone 100 in another form of the invention. Here, the cone 100 includes a bottom portion 102 which is configured to mate with a top portion 104 to complete the cone 100. The top portion 104 may be one of several sizes, illustrated as top portions 104A, 104B and 104C. The height of the cone 100 may vary depending upon which top portion 104A, 104B or 104C is utilized, thus allowing the same cone bottom portion 102 to be used in several water fountain configurations or sizes having different cone heights.

Of course, the cone 100 may also incorporate a debris filter or other filter described herein.

Figure 7:
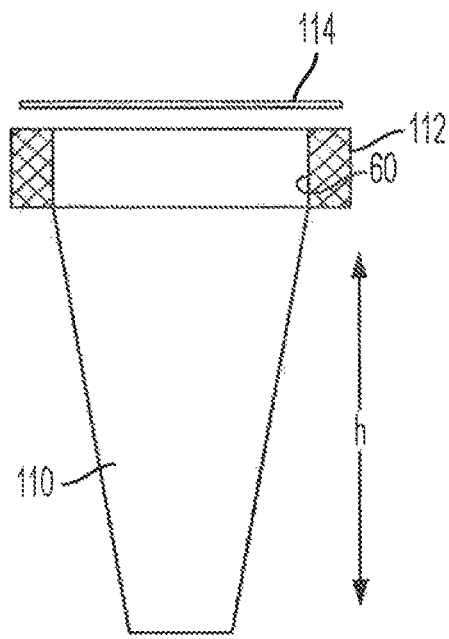
FIG. 7 is a cross-sectional side view of the cone portion of a centrifugal pump pet drinking fountain in an alternative embodiment.

With reference next to FIG. 7, there is shown a cone 110 in another form to the invention. Here, the cone 110 includes an annular universal radial filter 112 coupled to the top of the cone 110 through a snap or twist lock. The cone 110 may also include a lid 114 which fits over the top of the filter 102.

The filter 112 may be an absorption type filter which absorbs the impurities or particles and is replaced over time. The tangential velocity of the water W at the filter 112 causes the water W to be forced through the filter 112.

The use of the lid 114 allows the cone 110 to use a filter 112 for different pump heights as the lid forces the water W out of the sidewall 60.

Figure 8:
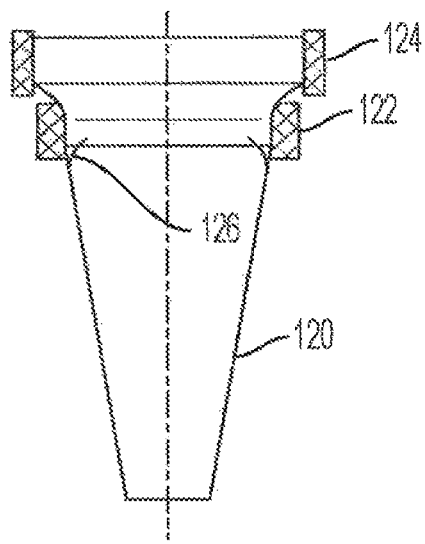
FIG. 8 is a cross-sectional side view of the cone portion of a centrifugal pump pet drinking fountain in an alternative embodiment.

With reference next to FIG. 8, there is shown a cone 120 in another form to the invention. Here, the cone 120 includes more than one filter, wherein the filters may be of different types depending upon the desired result, such as a mechanical debris filter, a contaminants filter, or a chemical filter. The cone 120 has the different filters located at different heights, as the cone is spun at different speeds the exit height is changed to encourage flow through the filter of choice. The cone 120 has an annular, first, lower filter 122 and an annular, second, upper filter 124. The lower filter 122 may be a filter that water constantly travels through during normal operation, such as an activated carbon filter. The upper filter 124 may be the type of filter which requires only a single pass through the filter to be useful. The upper filter 124 is one which is utilized each time that new water is added to the water fountain 10. To ensure that the new water is properly processed through the upper filter, the water fountain motor 72 is operated at a higher RPM to force the water W higher up the cone 120 than the standard RPM. The motor 72 would operate at the higher RPM for an amount of time to ensure that the water W within the bowl passes through the upper filter 124 before the motor returning to its normal RPM.

The cone 120 also may include a radial array of upwardly extending fins 126 extending inwardly from the interior surface of the cone 120. The fins 126 divert the flow of water W over the lower filter 122 when the motor 72 is operating at a higher RPM, so that the water W flows to and through the upper filter 124.

Figure 9:
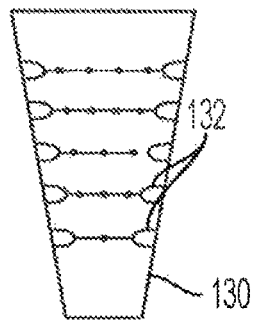
FIG. 9 is a cross-sectional side view of the cone portion of a centrifugal pump pet drinking fountain in an alternative embodiment.

With reference next to FIG. 9, there is shown a cone 130 in another form of the invention. Here, the cone 130 has an interior surface from which extends an annular array of inwardly extending projections, bumps, or knobs 132. The projections 132 may be arranged at several different heights along the cone 130.

The projections 132 are designed to perform two functions. First to act as a paddle and help push the water up the cone during centrifugal motion and second to catch hair and other particles as the water W flows across the interior surface of the cone 130.

Figure 10:
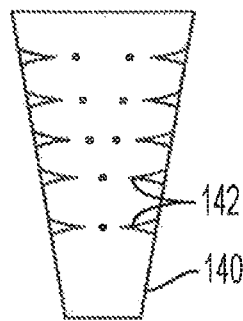
FIG. 10 is a cross-sectional side view of the cone portion of a centrifugal pump pet drinking fountain in an alternative embodiment.

With reference next to FIG. 10, there is shown a cone 140 in another form to the invention. Here, the cone 140 has an interior surface from which extends an annular array of inwardly extending needle-like projections, needles or sharp projections 142. The sharp projections 142 may be arranged at several different heights along the cone 140.

The sharp projections 142 are designed to catch hair and other particles as the water W flows across the interior surface of the cone 140.

Figure 11:
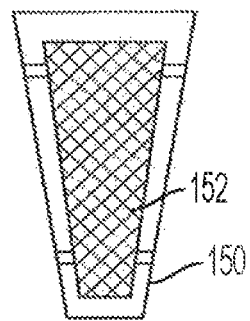
FIG. 11 is a cross-sectional side view of the cone portion of a centrifugal pump pet drinking fountain in an alternative embodiment.

With reference next to FIG. 11, there is shown a cone 150 in another form to the invention. Here, the cone 150 has an interior surface to which a mesh or mesh net 152 is coupled. The net 152 may be arranged to stand off or be spaced from the interior surface of the cone 150.

The net 152 is designed to catch hair and other particles as the water W flows across the interior surface of the cone 150.

The cone of any of the embodiments herein may be removed from the housing 22 by simply removing the cap 42 from the housing 22 and separating the cone axle 68 from the motor 72. Thus, allows the cone to be cleaned and/or the filter replaced, or the cone can be replaced.

Figure 12:
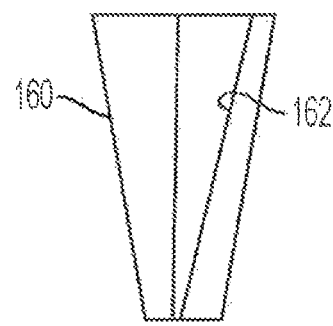
FIG. 12 is a cross-sectional side view of the cone portion of a centrifugal pump pet drinking fountain in an alternative embodiment.
Figure 13:
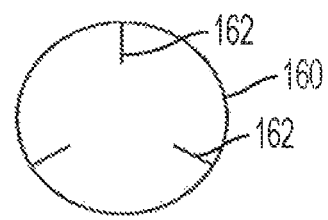
FIG. 13 is a top view of the cone portion of the centrifugal pump pet drinking fountain of FIG. 12.

With reference next to FIGS. 12 and 13, there is shown a cone 160 in another form to the invention. Here, the cone 160 has an interior surface from which extends a radial array of fins 162. The fins 162 aid in lifting or increasing the flowrate of the water as the cone 160 rotates.

Figure 14:
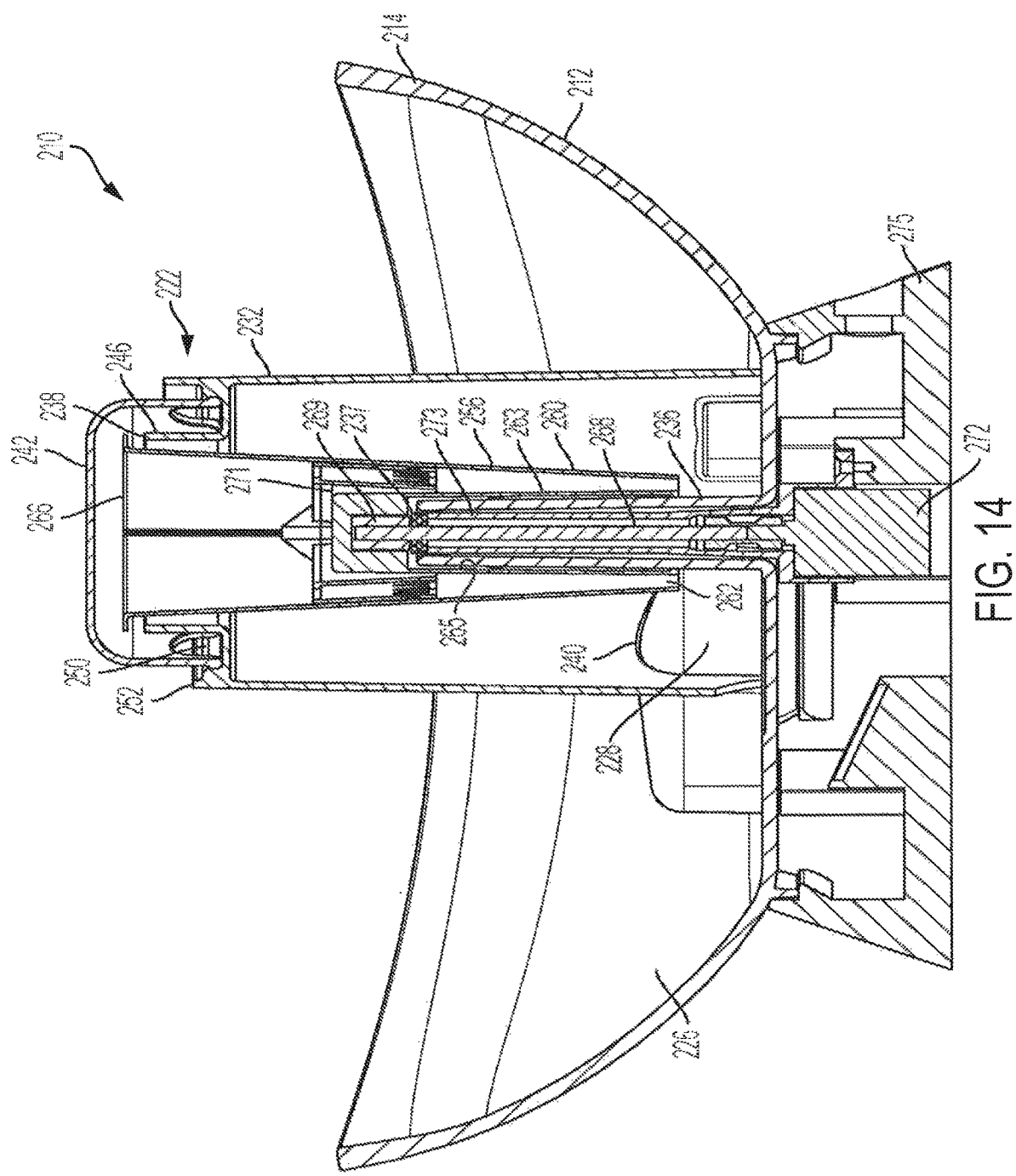
FIG. 14 is a cross-sectional side view of a centrifugal pump pet drinking fountain in an alternative embodiment.
Figure 15:
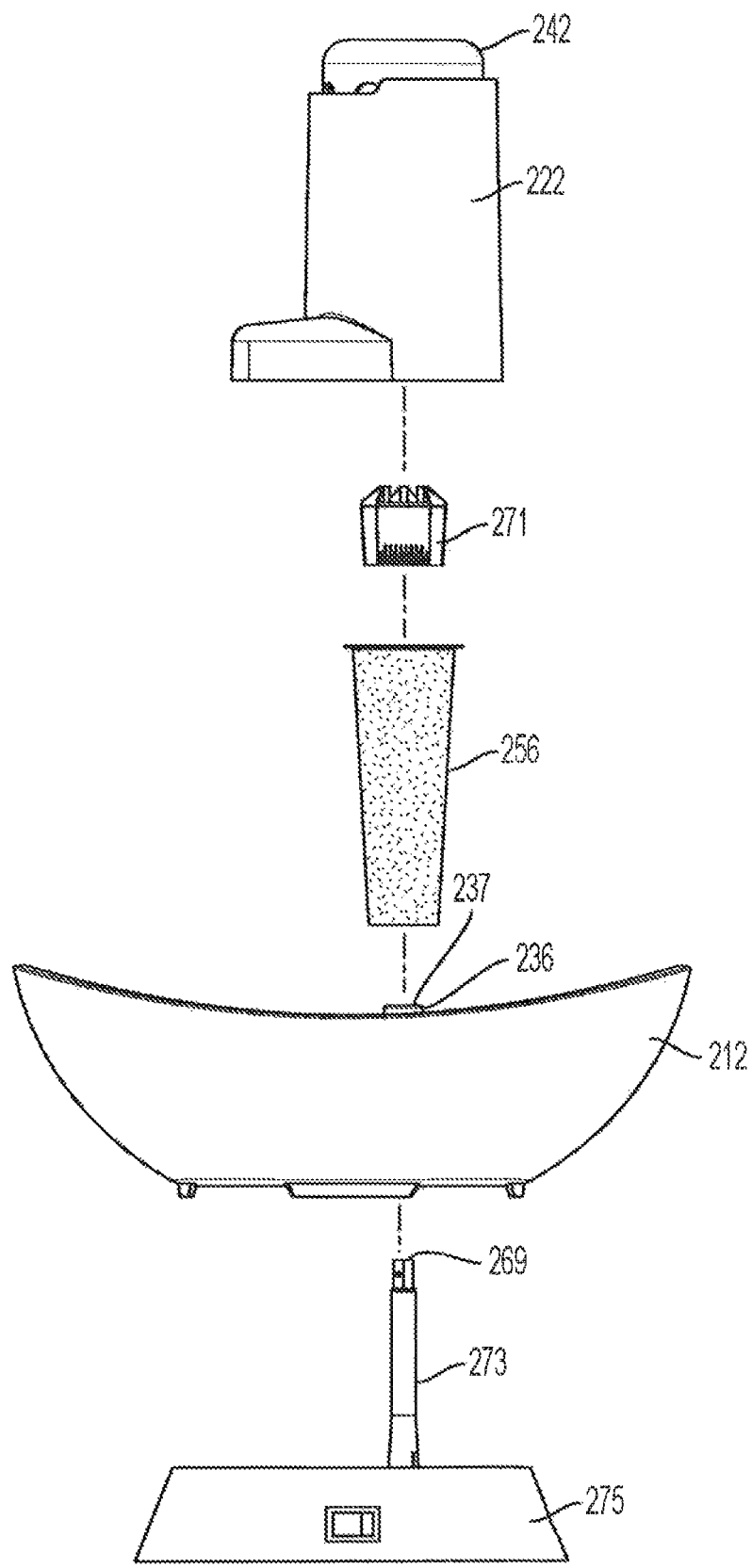
FIG. 15 is an exploded side view of a centrifugal pump pet drinking fountain of FIG. 14.

With reference next to FIGS. 14 and 15, there is a shown a centrifugal pump pet water fountain 210 in another form of the present invention. The pet water fountain 210 has a basin or bowl 212. The bowl 212 is defined by a peripheral wall 214 extending upwardly from a floor 216. The bowl 212 is configured to hold an aqueous drinking fluid, such as water W, for a pet.

The pet water fountain 210 not only holds the water W, but also circulates that water W so that it remains fresh and oxygenated. In addition, the water W may be filtered so that it is maintained in a clean or particle-free state. In order to provide the circulation and filtering functions, various components are provided. Those components are generally held within a housing 222 and are visible in the cross-sectional view of FIG. 14.

The housing 222 divides the bowl 212 into a drinking portion or basin 226 and an interior portion or basin 228. The drinking basin 226 is accessible to an animal at the front of the fountain 210, while the interior basin 228 is located behind and underneath the housing 222 and is not accessible to the animal. The bowl 212 has an elongated axle sleeve 236 having a top opening 237.

The housing 222 includes an upright, tubular sidewall 232. The housing 222 is separable or removable from the bowl 212 for cleaning purposes. The sidewall 232 defines a housing top opening 238 and has an inlet port or bottom opening 240 which allows the flow of water W from the drinking portion 226 to the interior portion 228, A cap 242 is telescopically and removably mounted to the top opening 238 of the housing 222.

The housing 222 also defines an annular cone mounting flange 246 which is spaced from the sidewall 232 so as to create a water reservoir 250 therebetween. The housing sidewall 232 also includes a spout 252 located adjacent the top opening 238 and in fluid communication with the reservoir 250.

A rotating cone-shaped water lifting tube or cone 256 is positioned within the housing 222 concentrically within the cone mounting flange 246. The cone 256 has an outer sidewall 260 which narrows or tapers as it extends downwardly to a water opening or inlet 262 adjacent a bottom portion of the cone 256. The cone 256 also has an inner sidewall 263 which is joined to the outer sidewall 260 along the bottom of the cone 256. The inner sidewall 263 forms a sleeve receiving channel 265 configured to receive axle sleeve 236 therein. The sleeve receiving channel 265 terminates at a central axle receiving boss 269. The cone outer sidewall 260 also defines a cone open top opening 266 opposite the inlet 262. An axle 268 extends through the axle sleeve 237 and is configured to be removably coupled to cone axle receiving boss 269. An annular shaped filter 271 may be positioned about boss 269. The axle 268 may include an axle housing 273.

The axle 268 is coupled to an electric motor 272 which is mounted below the bowl 212. The electric motor 272 may be any conventionally know AC, DC, brush, or brushless electric motor which may cause rotational movement of the axle 268, and thus the rotational movement of the entire cone 256, The electric motor 272 is electrically coupled to an optional electric kill switch positioned to engage the cap 242 when it is coupled to the housing 222 in a closed position. The motor may operate at different speeds according to the current provided to the motor, or may be regulated through a multi-position switch which also regulates the current to the motor. The motor 272 and any electrical components, including a power cord and on/off switch, may be coupled to and mounted within a lower housing or pedestal 275.

In use, water W is placed within the bowl 212 so that it rises to the appropriate level within the bowl 212 so as to fill both the drinking basin 226 and the interior basin 228. With the water W filled to this level, the water is well above the position of the cone inlet 262, however, the water is below the level of the axle sleeve top opening 237. With the water level below that of top opening 237, the water cannot flow into the top opening 237 and reach the motor. Thus, the top opening 237 does not require a water seal. The water fills the interior basin 228 by passing from the drinking basin 226 through the housing bottom opening 240 and into the interior basin 228.

With energization of the electric motor 272, the motor imparts a rotational motion upon the cone axle 268, which causes the entire cone 256 to rotate. The rotational motion of the cone 256 causes water within the bottom portion of the cone to climb the interior surface of the outwardly tapered sidewalls 260 through centrifugal force. The water flows through filter 271 prior to reaching the top of the cone 256. As the water flows over the top of the cone 256 or sidewalls 260, the water W is thrown into the reservoir 250.

The water W within the reservoir 250 pools until it reaches the level of the spout 252, wherein the water W starts to flow over the spout 252 and drops down back into the drinking basin 226. Thus, the water W continuously circulates or flows from the drinking basin 226, through the bottom opening 240 to the interior basin 228 where it is pumped into the reservoir 250 through the rotational action of the cone 256, and out of the reservoir 250 through the spout 252 and back into the drinking basin 226.

Again, the motor 272 is an air cooled motor rather than a water-cooled motor, thus avoiding the problem of the motor 272 heating the drinking water within the bowl 212.

Figure 16:
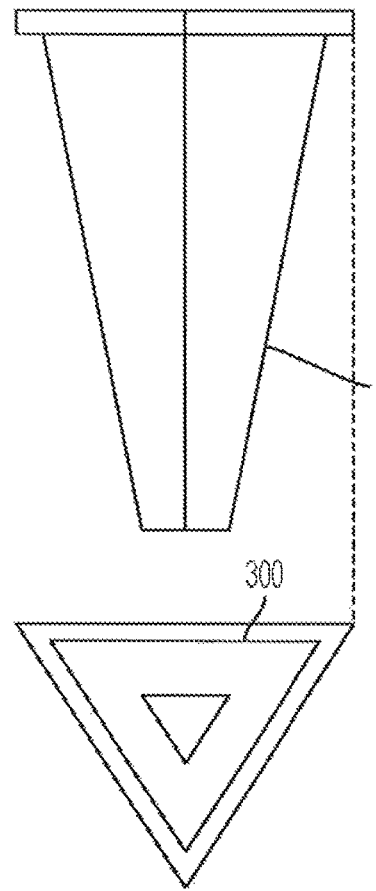
FIG. 16 is a side and top view of the cone portion of a centrifugal pump pet drinking fountain in an alternative embodiment.

With reference next to FIG. 16, there is shown a cone 300 in another form of the invention. Here, the cone 300 has a generally triangular shape rather than the round shape of a typical cone with respect to a horizontally oriented plane. The triangular shape aids in moving the water as the cone rotates.

Figure 17:
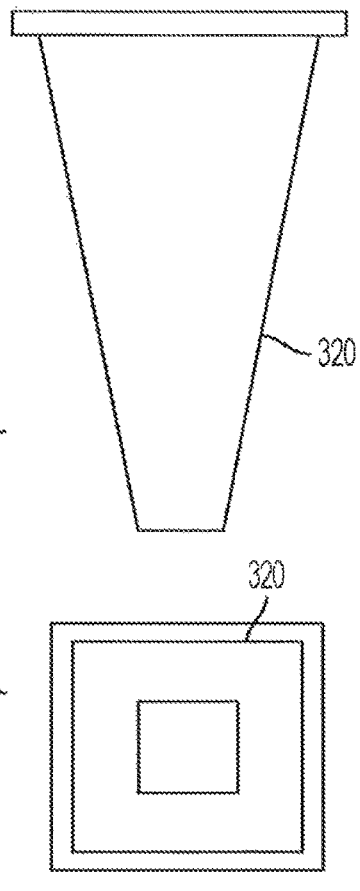
FIG. 17 is a side and top view of the cone portion of a centrifugal pump pet drinking fountain in an alternative embodiment.

With reference next to FIG. 17, there is shown a cone 320 in another form of the invention. Here, the cone 300 has a generally square shape rather than the round shape of a typical cone with respect to a horizontally oriented plane. The square shape aids in moving the water as the cone rotates.

Figure 18:
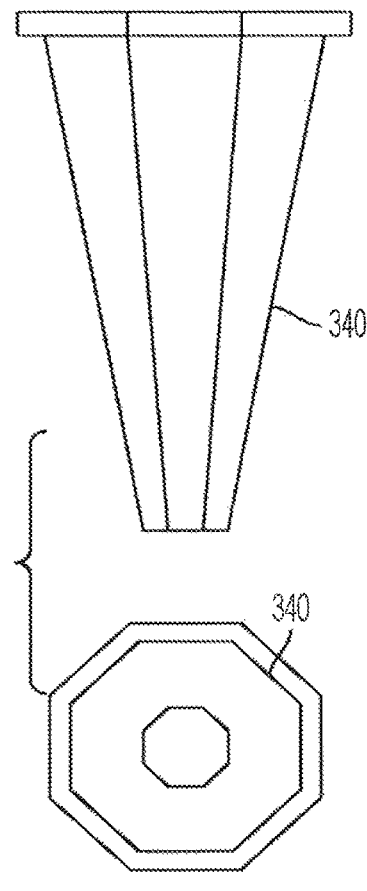
FIG. 18 is a side and top view of the cone portion of a centrifugal pump pet drinking fountain in an alternative embodiment.

With reference next to FIG. 18, there is shown a cone 340 in another form of the invention. Here, the cone 300 has a generally octagonal shape rather than the round shape of a typical cone with respect to a horizontally oriented plane. The octagonal shape aids in moving the water as the cone rotates.

Figure 19:
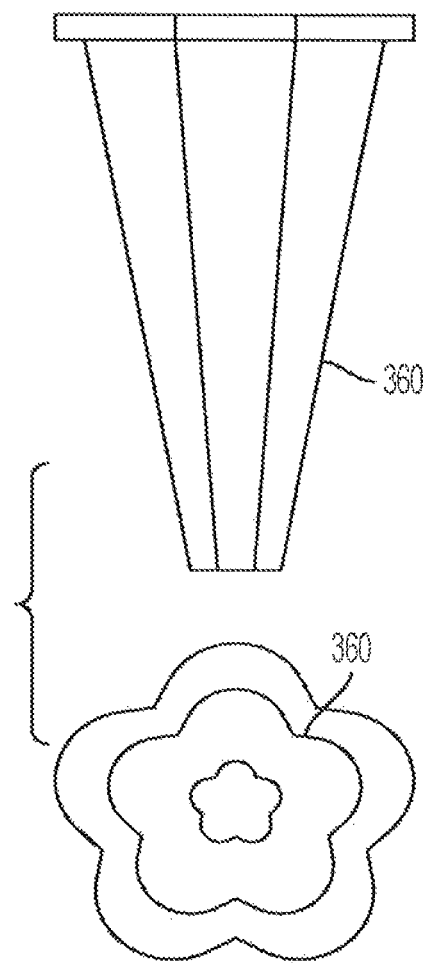
FIG. 19 is a side and top view of the cone portion of a centrifugal pump pet drinking fountain in an alternative embodiment.

With reference next to FIG. 19, there is shown a cone 360 in another form of the invention. Here, the cone 300 has an irregular shape rather than the round shape of a typical cone with respect to a horizontally oriented plane. The irregular shape aids in moving the water as the cone rotates.

The cones of FIGS. 16-19 show a variety of regular and irregular polygonal shaped cones, the polygonal shape taken along a cross-section plane oriented generally perpendicular to the axis or axle of the cone. The cone may also include curved segments as opposed to the straight-lined segments of polygons, thus, the cone may have a non-circular cross-section. As such, the term cone or cone-shaped tube as used herein is not limited to a tapered configuration having a circular cross-section, and may include any tapered configuration regardless of the cross-sectional shape perpendicular to the axis. In all cases, the cones being axially asymmetrical simulates the action of a fin to centrifugally push the water but now the inner surface of the cone is smooth and thus has less internal surfaces to clean.

Figure 20A:
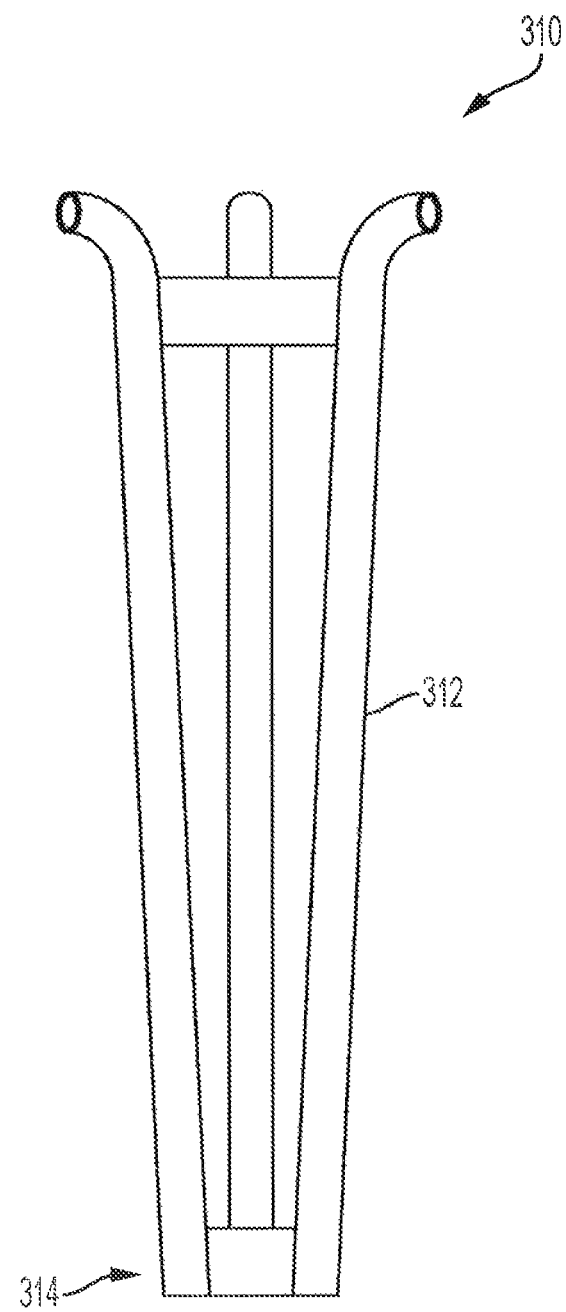
FIG. 20A is a side view of the cone portion of a centrifugal pump pet drinking fountain in an alternative embodiment
Figure 20B:
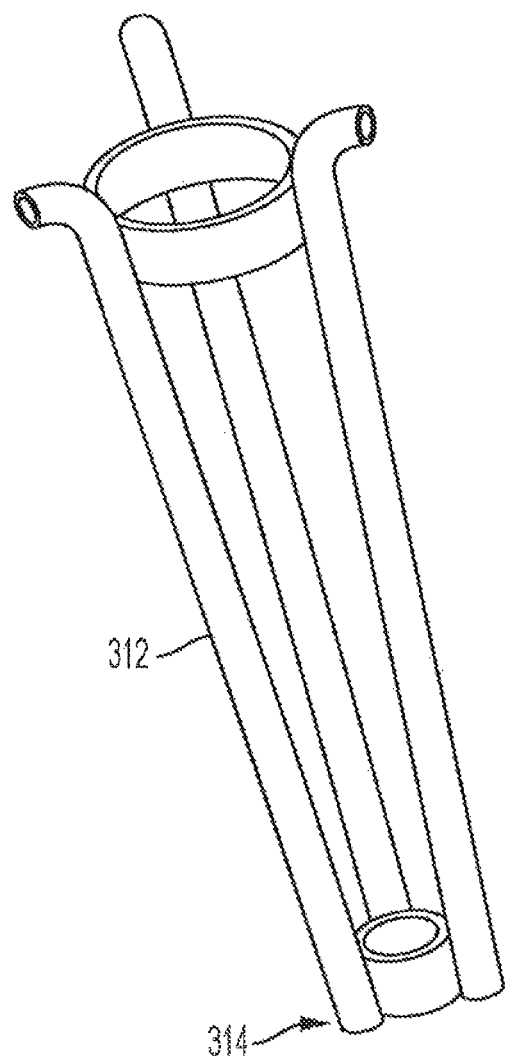
FIG. 20B is a perspective view of the cone portion of a centrifugal pump pet drinking fountain in an alternative embodiment

FIGS. 20A and 20B show an additional embodiment 310 of a cone. FIGS. 20A and 20B show an arrangement of one or more tubes 312 shaped in a cone configuration. Water enters the tubes at their lower end 314 and is forced up the tubes via centrifugal force.

Figure 21:
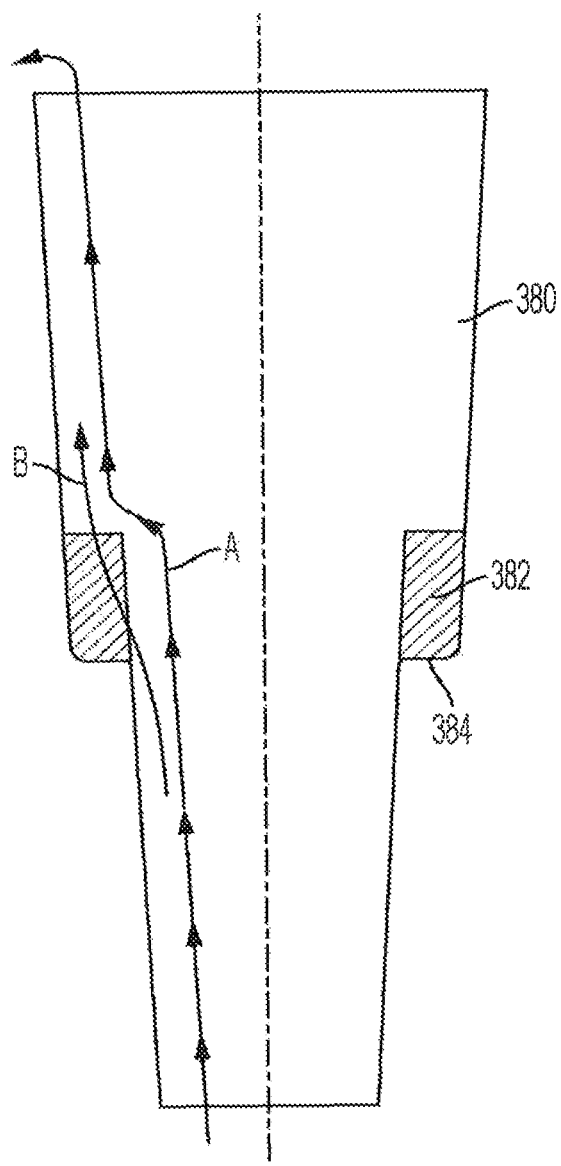
FIG. 21 is a side and top view of the cone portion of a centrifugal pump pet drinking fountain in an alternative embodiment.

With reference next to FIG. 21, there is shown a cone 380 in another form of the invention, Here, the cone 380 has a sidewall with a ledge 384 which forms a stepped configuration and an annular flow through water filter 382 positioned to abut the ledge 384 of step.

In use, the water flows generally over the filter, as indicated by the arrow A, but also flows outwardly through the filter 382. The centrifugal force created by the rotation of the cone helps in forcing the water through the filter 382, which increases the filters effectiveness.

Figure 22:
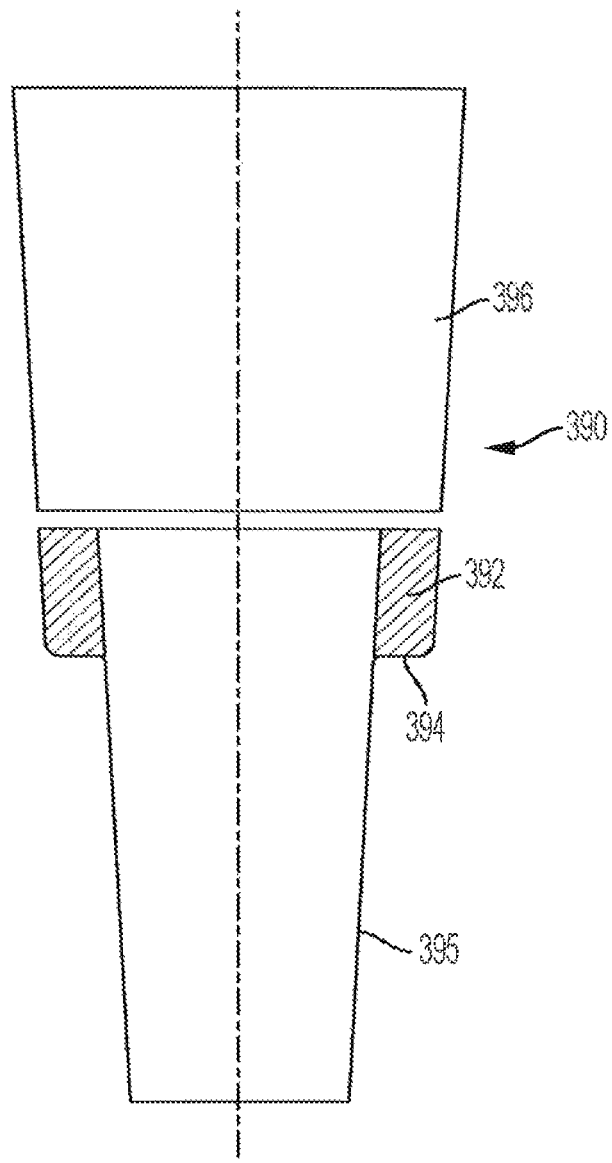
FIG. 22 is a side and top view of the cone portion of a centrifugal pump pet drinking fountain in an alternative embodiment.

With reference next to FIG. 22, there is shown a cone 390 in another form of the invention, Here, the cone 390 has a stepped configuration and an annular flow through water filter 392 located at the location of the step 394. The cone 390 includes a bottom portion 395 which is configured to mate with a top portion 396 to complete the cone 390. The top portion 396 may be one of several sizes, similar to that described in reference to FIG. 6. The height of the cone 390 may vary depending upon which top portion 396 is utilized, thus allowing the same cone bottom portion 395 to be used in several water fountain configurations or sizes having different cone heights. Also, as the filter is located in the bottom portion 395, the unwanted debris collects in the bottom portion. Thus, the bottom portion 395 may be removed and replaced with another similar bottom portion for quick cleaning of the pet water fountain.

It should be understood that the motor 72 may include electronics which monitor the electrical current, speed or RPM of the motor. With such capabilities, the clogging of a filter described herein will cause more water to be retained within the cone, requiring more electrical current to maintain the motor's RPM. As the electric current increases, a cut-off threshold programmed within the electronics may be detected to notify the system that a new filter or cleaning is required.

Figure 23:
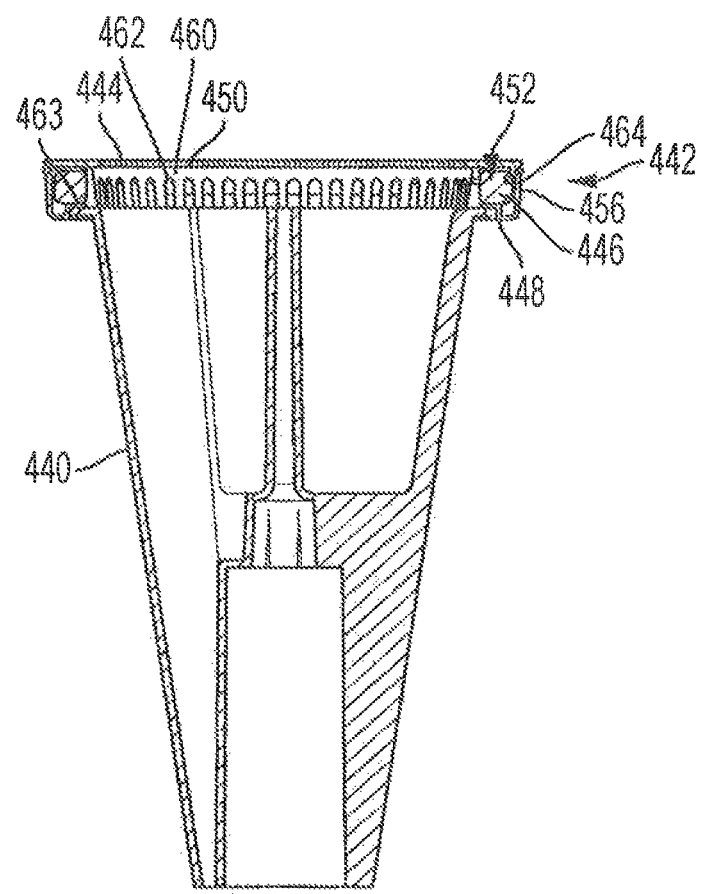
FIG. 23 is a side view of the cone portion of a centrifugal pump pet drinking fountain in an alternative embodiment, shown with a portion of an outboard wall removed to show an annular channel containing a filtering media.
Figure 24:
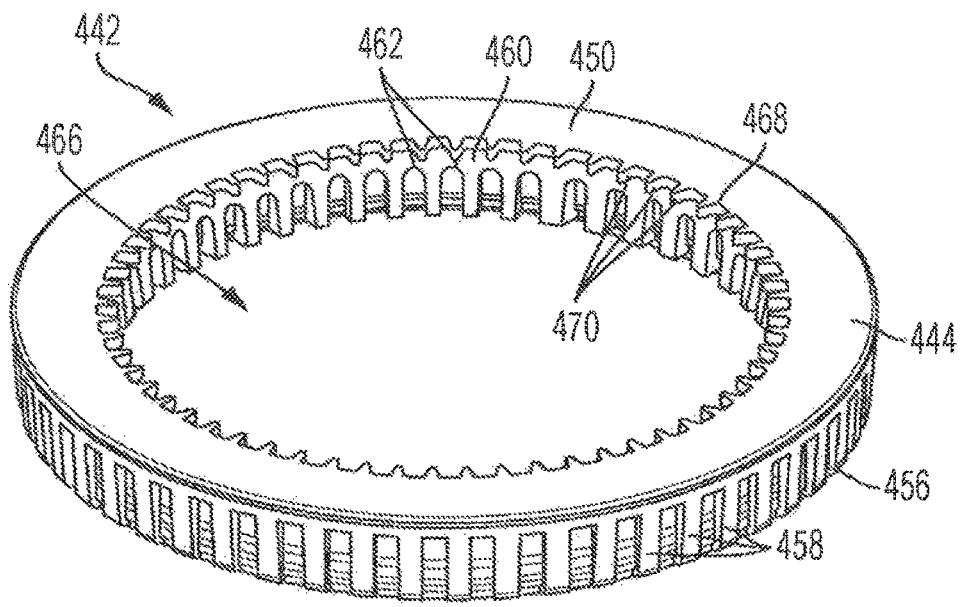
FIG. 24 is a perspective view of a filter portion of the cone portion of the centrifugal pump pet drinking fountain of FIG. 23.
Figure 25:
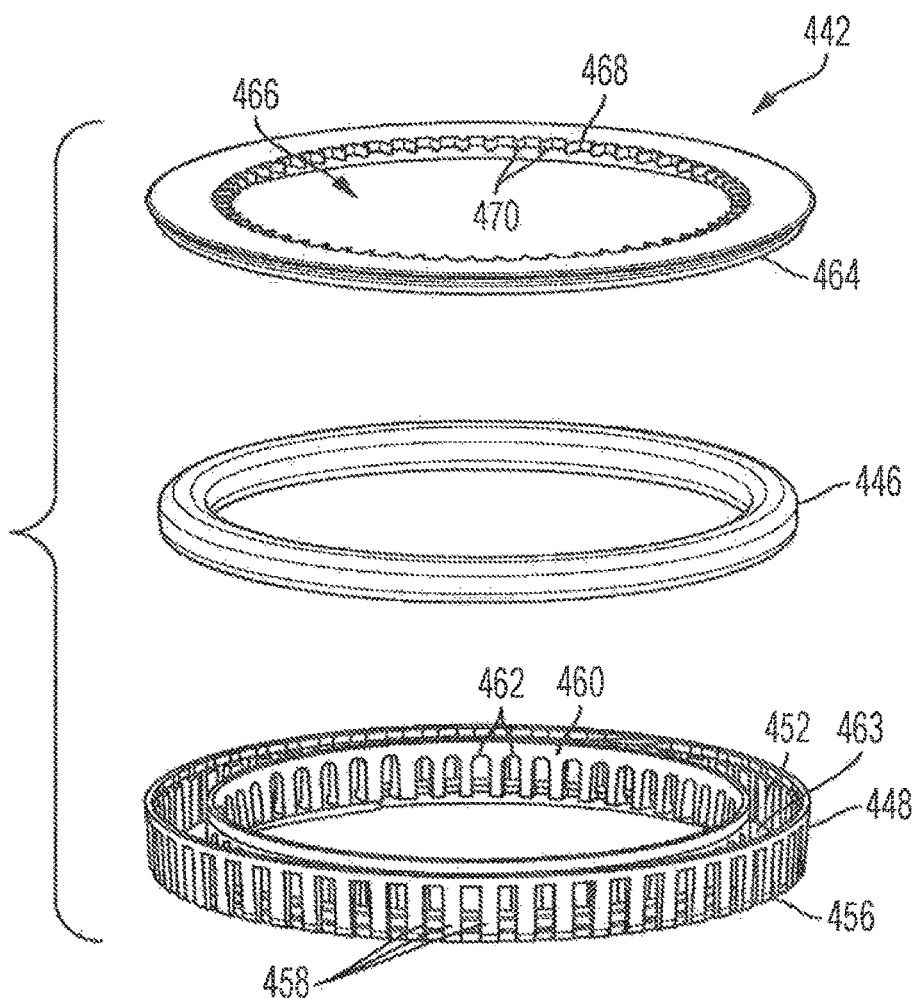
FIG. 25 is a perspective, exploded view of a filter portion of the cone portion of the centrifugal pump pet drinking fountain of FIG. 23.

With reference next to FIGS. 23-25, there is shown a cone 440 in another form of the invention. Here, the cone 440 includes an annular filter or filter ring 442 that is preferably removably coupled to the top of the cone 440 through a coupling means in the form of threads 441. The coupling means may be in the form of a mating snap lock, twist lock, magnetic coupler, mating threads, or the like. The coupling means may be associated with either the bottom surface, top surface, or both the bottom and top surfaces of the filter ring 442 to enable the filter ring to be mounted in either orientation. The filter ring 442 may be made of a plastic, composite, metal or other suitable material.

The filter ring 442 includes an exterior housing 444 and an annular, interior filtering media 446. The exterior housing 444 has a lower housing 448 and an upper housing 450 that remote or fit together to form an annular filter channel 452 therein in which resides the filter media 446. The lower housing 448 is generally U-shaped in cross-section, as best shown in FIG. 23.

The lower housing 448 has an upright, exterior, or outboard wall 456 having a plurality or an annular array of water exit openings 458 therethrough. Similarly, the lower housing 448 has an upright, interior, or inboard wall 460 having a plurality or an annular array of water entrance openings 462 therethrough. A floor 463 extends between the outboard wall 456 and inboard wall 460. The outboard wall 456, and inboard wall 460 are separated from each other to define the filter channel 452 therebetween.

The upper housing 450 is annular in shape and is configured to be removably coupled to the lower housing 448. Again, the removably coupling of the tipper and lower housings 450 and 448 may be accomplished through any conventional means, such as a mating snap lock, twist lock, magnetic coupler, mating threads, or the like. The tipper housing 448 is shown in the drawings having snap lock fittings or flanges 464 configured to engage the interior surfaces of the outboard and inboard walls 456 and 460 of the lower housing 448. The upper housing 450 has a central opening 466 defined by an interior edge or wall 468. The interior wall 468 has an annular array of radially aligned, inwardly extending fingers, projections, or protrusions 470.

The annular filter media 446 is preferably made of a carbon material. Alternatively, the filter media 446 may be made of a fine mesh, felt, filter paper, or the like. However, a carbon material is preferred as it may remove unwanted chemicals from the water.

In use and as previously described, water W is placed within the bowl 12 so that it rises to the appropriate level within the bowl 12 so as to fill both the drinking basin 26 and the interior basin 28. With the water W filled to this level, the water W is well above the position of the cone inlet 62 of cone 440. The water W fills the interior basin 28 by passing from the drinking basin 26 through the housing bottom opening 40 and into the interior basin 28.

With energization of the electric motor 72, the motor imparts a rotational motion upon the cone axle 68, which causes the entire cone 440 to rotate. The rotational motion of the cone 440 causes water within the bottom portion of the cone to climb the interior surface of the outwardly tapered sidewalls 60 through centrifugal force. As the water flows over the top of the cone 440 or sidewalls 60, the water W passes into the entrance openings 462 of the inboard wall 460 of the filter ring 442. The water W then passes through the filtering media 446 within the annular channel 452, wherein contaminants within the water are removed. Lastly, the water W exits the filter ring 442 through the exit openings 458 in the outboard wall 456 of the filter ring 442. Thus, the water W passes through the filter ring 442 to remove contaminants from the water W.

The rotation of the cone 440 and filter ring 442 creates a centrifugal force upon the water W that forces it through the filtering media, i.e., the addition of a centrifugal force on the water increases fluid pressure through the filtering media 446. The increased fluid pressure aids in restricting the harmful effects of a backpressure associated with filters of the prior art.

As the water W leaves the rotating filter ring 442 the water W is thrown into the reservoir 50. The water W within the reservoir 50 pools until it reaches the level of the spout 52, wherein the water W starts to flow over the spout 52 and drops down back into the drinking basin 26. Thus, the water W continuously circulates or flows from the drinking basin 26, through the bottom opening 40 to the interior basin 28 where it is pumped into the reservoir 50 through the rotational action of the cone 56, and out of the reservoir 50 through the spout 52 and back into the drinking basin 26. The protrusions 470 of the upper housing 450 function as a debris catchment which capture and remove animal hair from the water W.

The upper housing 450 is preferably removable from the lower housing 448 so that the filtering media 446 within the annular channel 452 may be cleaned or removed and replaced with another clean filtering media 446.

It should be understood that the filter ring 442 may include an indicator to show or indicate the useful life of the filtering media 446.

If the pet water fountain runs low on water, no water will reside within the interior of the cone. The lack of water results in less electrical current being required to maintain the motor's RPM. The decrease in current results in a low threshold being detected which halts the operation of the motor and notifies the system that more water is required.

It should be understood that with the present invention the air-cooled motor is positioned outside the bowl or the water, i.e., it is not submersed within the water. As such, the motor is not cooled by the water and no harm will come to the motor if the system runs dry of water, a problem associated with water cooled motors of the prior art water fountains. Also, as the motor is not submerged for cooling, the motor does not heat the drinking water, another problem associated with water cooled motors of the prior art water fountains.

Filters described herein may be of any conventional construction, such as foam, thin slots through a wall, nonwoven material, porous material, or the like.

A pet water fountain comprises a bowl for holding an aqueous drinking fluid, a housing configured to cover a portion of the bowl and have a fluid reservoir, a rotatable cone positioned within the cone mounting flange, the cone tapering outwardly from a bottom end to a top end, the cone bottom end having a fluid inlet to allow the passage of fluid from the bowl through the inlet and into the interior of the cone, the cone top end being in fluid communication with the housing fluid reservoir. The pet water fountain also has a filter ring coupled to the cone top end, the filter ring having an exterior housing and a filtering media positioned within the exterior housing, and an electric motor coupled to the rotatable cone for rotatably driving the rotatable cone.

The filter ring is removably coupled to the rotatable cone.

The filter ring has a lower housing and an upper housing, and wherein the lower housing includes an inboard wall and an outboard wall spaced from the inboard wall to define a channel therebetween, and wherein the filtering media is positioned within the channel.

The inboard wall has a plurality of water entrance openings, and wherein the outboard wall has a plurality of water exit openings.

The upper housing is removably coupled to the lower housing.

The pet water fountain of claim 1 wherein the filtering media is a carbon material.

The filter ring has a central opening, and wherein the filter ring has a plurality of inwardly extending projections.

The upper housing has a central opening, wherein the upper housing has a plurality of inwardly extending projections.

A pet water fountain for dispensing an aqueous drinking fluid comprises a bowl having a drinking portion and an interior portion, a housing at least partially covering the interior portion, a fluid reservoir in fluid communication with the bowl, a liquid pump in fluid communication with the bowl and the reservoir, the liquid pump including a cone-shaped tube coupled to an electric motor for rotation of the cone-shaped tube. The cone-shaped tube has a lower end positioned within the bowl and an upper end positioned adjacent the fluid reservoir. A water filter ring is coupled to the upper end of the cone-shaped tube, the water filter ring having an exterior housing with an interior wall with a plurality of water entrance openings and an exterior wall with a plurality of water exit openings, the water filter ring also having a filtering media positioned within the exterior housing between the interior wall and the exterior wall.

A pet water fountain has a water bowl, a housing coupled to the water bowl, a rotating cone coupled to the housing, the cone having a water inlet extending through a lower portion of the cone and a water outlet at an upper portion of the cone, a water filter coupled to the upper portion of the cone, the water filter having a filter housing and a filtering media positioned within the filter housing, and an electric motor coupled to the cone for rotational movement of the cone, the electric motor being positioned outside the water bowl.

A pet water fountain is described herein that comprises a bowl for holding an aqueous drinking fluid. The pet water fountain includes a housing configured to cover a portion of the bowl, the housing defining a cone mounting flange and a fluid reservoir. The pet water fountain includes a rotatable cone positioned within the cone mounting flange, the cone tapering outwardly from a bottom end to a top end, the cone bottom end having a fluid inlet to allow the passage of fluid from the bowl through the inlet and into the interior of the cone, the bowl top end being in fluid communication with the housing fluid reservoir. The pet water fountain includes an electric motor coupled to the rotatable cone for rotatably driving the rotatable cone.

The electric motor of an embodiment is positioned outside the bowl.

The electric motor of an embodiment is an air-cooled electric motor.

The cone of an embodiment includes a central axle and wherein the electric motor is coupled to the central axle.

The cone of an embodiment has an interior surface having a plurality of inwardly extending projections.

The projections of an embodiment are upwardly extending elongated ribs.

The projections of an embodiment are inwardly extending bumps.

The projections of an embodiment are inwardly extending needle like projections.

The cone of an embodiment has an interior surface, and wherein the pet water fountain further comprises a mesh overlaying the interior surface of the cone.

The cone of an embodiment includes a cone bottom portion and a cone top portion mounted to the cone bottom portion, whereby cone top portions of various heights may be mounted to the cone bottom portion to provide different overall heights of the cone.

The cone of an embodiment includes a water filter.

The water filter is a two-part water filter having a first part mounted at a first select height and a second part mounted at a second select height higher than the first select height of the first part, under an embodiment.

The cone includes a stepped sidewall forming a ledge, and wherein the pet water fountain further comprises a water filter positioned to abut the ledge, under an embodiment.

The cone of an embodiment has a non-circular cross-sectional shape along a plane perpendicular to an axis of the cone.

The cone of an embodiment has a polygonal cross-sectional shape along a plane perpendicular to an axis of the cone.

The cone of an embodiment includes an exterior sidewall having an interior water contacting surface and an interior sidewall forming an axle receiving channel.

A cap coupled to the housing positioned to overlay the cone top end, under an embodiment.

A pet water fountain is described herein for dispensing an aqueous drinking fluid, under an embodiment. The pet water fountain includes a bowl having a drinking portion and an interior portion. The pet water fountain includes a housing at least partially covering the interior portion. The pet water fountain includes a fluid reservoir in fluid communication with the bowl, and a liquid pump in fluid communication with the bowl and the reservoir, the liquid pump including a cone-shaped tube coupled to an electric motor for rotation of the cone-shaped tube, the cone-shaped tube having a lower end positioned within the bowl and an upper end positioned adjacent the fluid reservoir.

The electric motor of an embodiment is positioned outside the bowl.

The electric motor of an embodiment is an air-cooled electric motor.

The cone-shaped tube of an embodiment includes a central axle and wherein the electric motor is coupled to the central axle.

The cone-shaped tube of an embodiment has an interior surface having a plurality of inwardly extending projections.

The projections of an embodiment are upwardly extending ribs.

The projections of an embodiment are inwardly extending bumps.

The projections of an embodiment are inwardly extending needle like projections.

The cone-shaped tube has an interior surface, and wherein the pet water fountain further comprises a mesh overlaying the interior surface of the cone-shaped tube, under an embodiment.

The cone-shaped tube of an embodiment includes a water filter.

The water filter is a two-part water filter having a first part mounted at a first select height and a second part mounted at a second select height higher than the first select height of the first part, under an embodiment.

The cone-shaped tube includes a tube bottom portion and a tube top portion mounted to the tube bottom portion, whereby tube top portions of various heights may be mounted to the tube bottom portion to provide different overall heights of the cone-shaped tube, under an embodiment.

The cone-shaped tube includes a stepped sidewall forming a ledge, and wherein the pet water fountain further comprises a water filter positioned to abut the ledge, under an embodiment.

The cone-shaped tube has a non-circular cross-sectional shape along a plane perpendicular to an axis of the cone-shaped tube, under an embodiment.

The cone-shaped tube has a polygonal cross-sectional shape along a plane perpendicular to an axis of the cone-shaped tube, under an embodiment.

The cone-shaped tube includes an exterior sidewall having an interior water contacting surface and an interior sidewall forming an axle receiving channel, under an embodiment.

A cap is coupled to the housing positioned to overlay the cone-shaped tube top end, under an embodiment.

A pet water fountain is described that comprises a water bowl. The pet water fountain includes a housing coupled to the water bowl. The pet water fountain includes a rotating cone coupled to the housing, the cone having a water inlet extending through a lower portion of the cone and a water outlet at an upper portion of the cone, and an electric motor coupled to the cone for rotational movement of the cone, the electric motor being positioned outside the water bowl.

The electric motor of an embodiment is positioned outside the bowl.

The electric motor of an embodiment is an air-cooled electric motor.

The cone of an embodiment includes a central axle and wherein the electric motor is coupled to the central axle.

The cone of an embodiment has an interior surface having a plurality of inwardly extending projections.

The projections of an embodiment are upwardly extending ribs.

The projections of an embodiment are inwardly extending bumps.

The projections of an embodiment are inwardly extending needle like projections.

The cone of an embodiment has an interior surface, and wherein the pet water fountain further comprises a mesh overlaying the interior surface of the cone.

The cone of an embodiment includes a water filter.

The water filter is a two-part water filter having a first part mounted at a first select height and a second part mounted at a second select height higher than the first select height of the first part, under an embodiment.

The cone includes a cone bottom portion and a cone top portion mounted to the cone bottom portion, whereby cone top portions of various heights may be mounted to the cone bottom portion to provide different overall heights of the cone, under an embodiment.

The cone includes a stepped sidewall forming a ledge, and wherein the pet water fountain further comprises a water filter positioned to abut the ledge, under an embodiment.

The cone of an embodiment has a non-circular cross-sectional shape along a plane perpendicular to an axis of the cone.

The cone of an embodiment has a polygonal cross-sectional shape along a plane perpendicular to an axis of the cone.

The cone includes of an embodiment an exterior sidewall having an interior water contacting surface and an interior sidewall forming an axle receiving channel.

A cap is coupled to the housing positioned to overlay the cone upper portion, under an embodiment.

A pet water fountain filter ring comprises an annular exterior housing having an interior wall with a plurality of water entrance openings and an exterior wall with a plurality of water exit openings, the interior wall and the exterior wall forming a filter channel therebetween, and an annular water filtering media positioned within the filter channel of the exterior housing.

The pet water fountain filter ring interior wall has a plurality of inwardly and radially extending projections.

The exterior housing includes a floor extending between the interior wall and the exterior wall. The exterior housing also includes an upper housing extending between the interior wall and the exterior wall oppositely disposed from the floor. The upper housing may be removably coupled to the exterior housing.

A pet water fountain filter ring comprises an annular exterior housing having an interior wall, an exterior wall and a floor extending between the interior wall and exterior wall to form a U-shaped filter channel. The interior wall has a plurality of water entrance openings therethrough. The exterior wall has a plurality of water exit openings therethrough. The pet water fountain filter ring also has an annular water filtering media positioned within the filter channel of the exterior housing.

Variations of the water fountain for watering an animal may fall within the spirit of the claims, below. It will be appreciated that the inventions are susceptible to modification, variation, and change without departing from the spirit thereof.

The invention claimed is:

1. A pet water fountain filter ring comprising: an annular exterior housing having an interior wall with a plurality of water entrance openings and an exterior wall with a plurality of water exit openings, the interior wall and the exterior wall forming a filter channel therebetween, and an annular water filtering media positioned within the filter channel of the exterior housing; and wherein the interior wall has a plurality of inwardly extending projections.

2. The pet water fountain filter ring of claim 1 wherein the inwardly extending projections extend radially from an upper housing of the exterior housing.

3. The pet water fountain filter ring of claim 2 wherein the exterior housing includes a floor extending between the interior wall and the exterior wall.

4. The pet water fountain filter ring of claim 3 wherein the upper housing extends between the interior wall and the exterior wall oppositely disposed from the floor.

5. A pet water fountain filter ring comprising: an annular exterior housing having an interior wall, an exterior wall and a floor extending between the interior wall and exterior wall to form a U-shaped filter channel, the interior wall having a plurality of water entrance openings therethrough, the exterior wall having a plurality of water exit openings therethrough, and an annular water filtering media positioned within the filter channel of the exterior housing.

6. The pet water fountain filter ring of claim 5 wherein the interior wall has a plurality of inwardly extending projections.

7. The pet water fountain filter ring of claim 6 wherein the inwardly extending projections extend radially from an upper housing of the exterior housing.

8. The pet water fountain filter ring of claim 7 wherein the upper housing extends between the interior wall and the exterior wall oppositely disposed from the floor.

9. A pet water fountain combination water lifting tube and filter ring comprising: a water lifting tube, and an annular filter ring coupled to the water lifting tube, the filter ring having an annular exterior housing having an interior wall with a plurality of water entrance openings and an exterior wall with a plurality of water exit openings, the interior wall and the exterior wall forming a filter channel therebetween, and an annular water filtering media positioned within the filter channel of the exterior housing; and wherein the interior wall has a plurality of inwardly extending projections.

10. The pet water fountain combination water lifting tube and filter ring of claim 9 wherein the inwardly extending projections extend radially from an upper housing of the exterior housing.

11. The pet water fountain combination water lifting tube and filter ring of claim 10 wherein the exterior housing includes a floor extending between the interior wall and the exterior wall.

12. The pet water fountain combination water lifting tube and filter ring of claim 11 wherein the upper housing extends between the interior wall and the exterior wall oppositely disposed from the floor.

13. The pet water fountain combination water lifting tube and filter ring of claim 9 wherein the water lifting tube is a cone.

14. The pet water fountain combination water lifting tube and filter ring of claim 13 wherein a cone inlet of the water lifting tube is positioned within a body of water.

15. The pet water fountain combination water lifting tube and filter ring of claim 14, wherein an annular filter ring and the water lifting tube are coupled to a drive mechanism, wherein the drive mechanism is configured to impart annular rotation to the annular filter ring and the water lifting tube through the coupling.

16. The pet water fountain combination water lifting tube and filter ring of claim 15, wherein the annular rotation drives water through the cone inlet and up an interior surface of the water lifting tube toward the annular filter ring.

17. The pet water fountain combination water lifting tube and filter ring of claim 16, wherein the water upon reaching the annular filter ring enters the plurality of water entrance openings, passes through the annular water filtering media, and exits the plurality of water exit openings.

* * * * *